(12) United States Patent  
Hampel et al.

(10) Patent No.: US 8,929,424 B2  
(45) Date of Patent: Jan. 6, 2015

(54) PERIODIC CALIBRATION FOR COMMUNICATION CHANNELS BY DRIFT TRACKING

(71) Applicant: Rambus Inc., Sunnyvale, CA (US)

(72) Inventors: Craig E. Hampel, Los Altos, CA (US); Frederick A. Ware, Los Altos Hills, CA (US); Richard E. Perego, Thornton, CO (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 14/145,966

(22) Filed: Jan. 1, 2014

(65) Prior Publication Data

US 2014/0133536 A1    May 15, 2014

Related U.S. Application Data

(63) Continuation of application No. 13/452,543, filed on Apr. 20, 2012, now Pat. No. 8,644,419, which is a continuation of application No. 12/173,530, filed on Jul. 15, 2008, now Pat. No. 8,165,187, which is a continuation of application No. 11/754,107, filed on May 25, 2007, now Pat. No. 7,400,671, which is a continuation of application No. 10/766,761, filed on Jan. 28, 2004, now Pat. No. 7,400,670.

(51) Int. Cl.

| | |
|---|---|
| *H04B 3/46* | (2006.01) |
| *H04B 17/00* | (2006.01) |
| *H04L 7/00* | (2006.01) |
| *H04L 7/04* | (2006.01) |
| *H04L 27/00* | (2006.01) |
| *H04L 7/10* | (2006.01) |
| *H04Q 1/20* | (2006.01) |

(52) U.S. Cl.  
CPC .............. *H04B 17/00* (2013.01); *H04L 7/0004* (2013.01); *H04L 7/043* (2013.01); *H04L 27/00* (2013.01); *H04L 7/10* (2013.01)  
USPC .............................. 375/224; 375/219; 375/295

(58) Field of Classification Search  
CPC .............. H04B 1/40; H04B 3/23; H04L 1/20; H04L 1/24; H04L 1/0003; H04L 1/0071  
USPC ......... 375/219, 224, 295; 369/44.27; 324/601  
See application file for complete search history.

(56) References Cited

U.S. PATENT DOCUMENTS 3,155,102 A    11/1964   Niederer, Jr. et al.  
3,638,121 A     1/1972   Spilker, Jr.

(Continued)

FOREIGN PATENT DOCUMENTS

JP    2000-035831 A2    2/2000  
WO    WO-01/16954 A      3/2001

OTHER PUBLICATIONS

"Draft Standard for a High-Speed Memory Interface (SyncLink)," Draft 0.99 IEEE P1596.7-199X, pp. 1-56 (1996), Microprocessor and Microcomputer Standards Subcommittee of the IEEE Computer Society. 66 pages.

(Continued)

*Primary Examiner* — Ted Wang

(57) ABSTRACT

A method and system that provides for execution of a first calibration sequence, such as upon initialization of a system, to establish an operation value, which utilizes an algorithm intended to be exhaustive, and executing a second calibration sequence from time to time, to measure drift in the parameter, and to update the operation value in response to the measured drift. The second calibration sequence utilizes less resources of the communication channel than does the first calibration sequence. In one embodiment, the first calibration sequence for measurement and convergence on the operation value utilizes long calibration patterns, such as codes that are greater than 30 bytes, or pseudorandom bit sequences having lengths of $2^N-1$ bits, where N is equal to or greater than 7, while the second calibration sequence utilizes short calibration patterns, such as fixed codes less than 16 bytes, and for example as short as 2 bytes long.

19 Claims, 13 Drawing Sheets

(56) References Cited

U.S. PATENT DOCUMENTS

| | | | |
|---|---|---|---|
| 3,922,491 | A | 11/1975 | Bjork et al. |
| 4,384,354 | A | 5/1983 | Crawford et al. |
| 4,648,133 | A | 3/1987 | Vilnrotter |
| 5,111,208 | A | 5/1992 | Lopez |
| 5,122,978 | A | 6/1992 | Merrill |
| 5,243,626 | A | 9/1993 | Devon et al. |
| 5,265,211 | A | 11/1993 | Amini et al. |
| 5,329,489 | A | 7/1994 | Diefendorff |
| 5,436,908 | A | 7/1995 | Fluker et al. |
| 5,485,490 | A | 1/1996 | Leung et al. |
| 5,485,602 | A | 1/1996 | Ledbetter, Jr. et al. |
| 5,511,091 | A | 4/1996 | Saito |
| 5,523,760 | A | 6/1996 | McEwan |
| 5,541,967 | A | 7/1996 | Gluska et al. |
| 5,548,146 | A | 8/1996 | Kuroda et al. |
| 5,554,945 | A | 9/1996 | Lee et al. |
| 5,621,913 | A | 4/1997 | Tuttle et al. |
| 5,671,376 | A | 9/1997 | Bucher et al. |
| 5,684,966 | A | 11/1997 | Gafford et al. |
| 5,742,798 | A | 4/1998 | Goldrian |
| 5,771,356 | A | 6/1998 | Leger et al. |
| 5,778,436 | A | 7/1998 | Kedem et al. |
| 5,859,881 | A | 1/1999 | Ferraiolo et al. |
| 6,047,346 | A | 4/2000 | Lau et al. |
| 6,163,570 | A | 12/2000 | Olafsson |
| 6,173,345 | B1 | 1/2001 | Stevens |
| 6,181,166 | B1 | 1/2001 | Krishnamurthy et al. |
| 6,219,384 | B1 | 4/2001 | Kliza et al. |
| 6,243,776 | B1 | 6/2001 | Lattimore et al. |
| 6,282,210 | B1 | 8/2001 | Rapport et al. |
| 6,321,282 | B1 | 11/2001 | Horowitz et al. |
| 6,359,931 | B1 | 3/2002 | Perino et al. |
| 6,369,652 | B1 | 4/2002 | Nguyen et al. |
| 6,377,640 | B2 | 4/2002 | Trans |
| 6,396,329 | B1 | 5/2002 | Zerbe |
| 6,421,389 | B1 | 7/2002 | Jett et al. |
| 6,434,081 | B1 | 8/2002 | Johnson et al. |
| 6,442,644 | B1 | 8/2002 | Gustavson et al. |
| 6,448,815 | B1 | 9/2002 | Talbot et al. |
| 6,457,089 | B1 | 9/2002 | Robbins et al. |
| 6,463,392 | B1 | 10/2002 | Nygaard et al. |
| 6,469,555 | B1 | 10/2002 | Lau et al. |
| 6,473,439 | B1 | 10/2002 | Zerbe et al. |
| 6,480,026 | B2 | 11/2002 | Andrews et al. |
| 6,484,232 | B2 | 11/2002 | Olarig et al. |
| 6,510,503 | B2 | 1/2003 | Gillingham et al. |
| 6,539,072 | B1 | 3/2003 | Donnelly et al. |
| 6,556,934 | B2 | 4/2003 | Higashide |
| 6,560,716 | B1 | 5/2003 | Gasparik et al. |
| 6,606,350 | B2 | 8/2003 | Dress, Jr. et al. |
| 6,606,576 | B2 | 8/2003 | Sessions |
| 6,639,957 | B2 | 10/2003 | Cahill-O'Brien et al. |
| 6,643,787 | B1 | 11/2003 | Zerbe et al. |
| 6,657,468 | B1 | 12/2003 | Best et al. |
| 6,662,305 | B1 | 12/2003 | Salmon et al. |
| 6,690,741 | B1 | 2/2004 | Larrick, Jr. et al. |
| 6,691,214 | B1 | 2/2004 | Li et al. |
| 6,693,918 | B1 | 2/2004 | Dallabetta et al. |
| 6,717,992 | B2 | 4/2004 | Cowie et al. |
| 6,725,304 | B2 | 4/2004 | Arimilli et al. |
| 6,735,709 | B1 | 5/2004 | Lee et al. |
| 6,751,696 | B2 | 6/2004 | Farmwald et al. |
| 6,873,939 | B1 | 3/2005 | Zerbe et al. |
| 6,889,357 | B1 | 5/2005 | Keeth et al. |
| 6,920,540 | B2 | 7/2005 | Hampel et al. |
| 7,072,355 | B2 | 7/2006 | Kizer |
| 7,099,424 | B1 | 8/2006 | Chang et al. |
| 7,119,549 | B2 | 10/2006 | Lee et al. |
| 7,137,048 | B2 | 11/2006 | Zerbe et al. |
| 7,196,979 | B2 | 3/2007 | Kadlec et al. |
| 7,535,933 | B2 | 5/2009 | Zerbe et al. |
| 2001/0048382 | A1 | 12/2001 | Low et al. |
| 2001/0053175 | A1 | 12/2001 | Hoctor et al. |
| 2001/0056332 | A1 | 12/2001 | Abrosimov et al. |
| 2002/0054648 | A1 | 5/2002 | Krummrich et al. |
| 2002/0066001 | A1 | 5/2002 | Olarig et al. |
| 2002/0072870 | A1 | 6/2002 | Adam et al. |
| 2002/0138224 | A1 | 9/2002 | Sessions |
| 2002/0149824 | A1 | 10/2002 | Beaulieu et al. |
| 2002/0184461 | A1 | 12/2002 | Zumkehr |
| 2003/0026399 | A1 | 2/2003 | Carlson |
| 2003/0063597 | A1 | 4/2003 | Suzuki |
| 2003/0065465 | A1 | 4/2003 | Johnson et al. |
| 2003/0065845 | A1 | 4/2003 | Riley |
| 2003/0117864 | A1 | 6/2003 | Hampel et al. |
| 2003/0131160 | A1 | 7/2003 | Hampel et al. |
| 2003/0146800 | A1 | 8/2003 | Dvorak |
| 2003/0149991 | A1 | 8/2003 | Reidhead et al. |
| 2003/0158994 | A1 | 8/2003 | Moy |
| 2003/0198212 | A1 | 10/2003 | Hoctor et al. |
| 2003/0198308 | A1 | 10/2003 | Hoctor et al. |
| 2003/0221061 | A1 | 11/2003 | El-Batal et al. |
| 2004/0032354 | A1 | 2/2004 | Knobel et al. |
| 2004/0054830 | A1 | 3/2004 | Craft et al. |
| 2004/0057500 | A1 | 3/2004 | Balachandran et al. |
| 2004/0199674 | A1 | 10/2004 | Brinkhus |
| 2004/0217881 | A1 | 11/2004 | Pedyash et al. |
| 2004/0260858 | A1 | 12/2004 | Primrose |
| 2005/0081942 | A1 | 4/2005 | Schwane et al. |
| 2005/0163202 | A1* | 7/2005 | Hampel et al. ............... 375/219 |

OTHER PUBLICATIONS

Banu et al., "TA 6.4: A 660Mb/s CMOS Clock Recovery Circuit with Instantaneous Locking for NRZ Data and Burst-Mode Transmission," IEEE International Solid State Circuits Conference, 1993, pp. 102-103, 270. 4 pages.

Cerisola et al., "CORD—a WDM Optical Network: Control Mechanism Using Subcarrier Multiplexing and Novel Synchronization Solutions," 1995 IEEE International Conference, vol. 1, Jun. 18-22, 1995, pp. 261-265. 6 pages.

Chang et al., "A 2 Gb/s Asymmetric Serial Link for High-Bandwidth Packet Switches," Hot Interconnects V, Stanford University, Aug. 1997. 9 pages.

Chang, Kun-Yung, "Design of a CMOS Asymmetric Serial Link," A Dissertation Submitted to the Department of Electrical Engineering and the Committee on Graduate Studies of Stanford University, Aug. 1999. 133 pages.

Dally et al., "Digital Systems Engineering," Cambridge University Press, 1998, pp. 447-449. 3 pages.

Daniele et al., "Principle and Motivations of UWB Technology for High Data Rate WPAN Applications," SOC 2003. 4 pages.

Daniele, Norbert, "Ultra Wide Band Principles and Applications for Wireless Communications," CEA-LETI Annual Review, Jun. 25-26, 2002. 23 pages.

EIA/JEDEC Standard No. 8-6 (EIA/JESD8-6), "High Speed Transceiver Logic (HSTL) A 1.5 V Output Buffer Supply Voltage Based Interface Standard for Digital Integrated Circuits," Aug. 1995. 16 pages.

EIA/JEDEC Standard No. 8-B (JESD8-B), "Interface Standard for Nominal 3 V/3.3 V Supply Digital Integrated Circuits," Sep. 1999. 10 pages.

Eldering et al., "Digital Burst Mode Clock Recovery Technique for Fiber-Optic Systems," Journal of Lightwave Technology, vol. 12, No. 2, Feb. 1994, pp. 271-279. 12 pages.

EP Examination Report dated Nov. 6, 2007 in EP Application No. 05706081.6. 5 pages.

EP Office Action with mail date of Jan. 15, 2010 re EP Application No. 05 711 891.1, includes references cited. 5 pages.

EP Response dated May 25, 2010 to the Official Communication dated Jan. 15, 2010 re EP Application No. 05711891.1, Includes New claims 1-24 (highlighted and clear copies) and New Description pp. 3, 3a, 3b. 30 pages.

EP Supplementary Search Report dated Dec. 18, 2007 in EP Patent Application No. 05711891.1. 3 pages.

Gillingham et al., "SLDRAM: High Performance Open-Standard Memory," IEEE Micro, Nov./Dec. 1997, pp. 29-39, vol. 17, No. 6, Institute of Electrical and Electronics Engineers, Inc., Los Alamitos, California. 11 pages.

(56) References Cited

OTHER PUBLICATIONS

Gillingham, Peter, "SLDRAM Architectural and Functional Overview," SLDRAM Consortium, Aug. 29, 1997, pp. 1-14. 14 pages.
Hampel, Craig, U.S. Appl. No. 12/173,530, filed Jul. 15, 2008, re Response dated Oct. 4, 2011. 21 pages.
Hampel, Craig, U.S. Appl. No. 12/173,530, filed Jul. 15, 2008, re Final Office Action mailed Jan. 24, 2012. 10 pages.
Hampel, Craig, U.S. Appl. No. 12/173,530, filed Jul. 15, 2008, re Notice of Allowance and Fee(s) Due mailed Feb. 22, 2012. 10 pages.
Hampel, Craig, U.S. Appl. No. 12/173,530, filed Jul. 15, 2008, re Response After Final dated Jan. 30, 2012. 11 pages.
Hampel, Craig, U.S. Appl. No. 12/173,530, filed Jul. 15, 2008, re Office Action dated Jun. 9, 2011. 15 pages.
Hampel, Craig, U.S. Appl. No. 12/173,530, filed Jul. 15, 2008, re Supplemental Amendment dated Oct. 18, 2011. 11 pages.
Hu et al., "A Monolithic 480 Mb/s Parallel AGC/Decision/Clock-Recovery Circuit in 1.2-um CMOS," IEEE Journal of Solid-State Circuits, vol. 28, No. 12, Dec. 1993, pp. 1314-1320. 8 pages.
Intel Corporation, "How to Measure RDRAM System Clock Jitter," Application Note AP-667, Jun. 1999, pp. 1-15. 15 pages.
JEDEC Standard (JESD8-16), "Bus Interconnect Logic (BIC) for 1.2 Volts," Apr. 2004. 15 pages.
Kim et al., "An 800Mbps Multi-Channel CMOS Serial Link with 3x Oversampling," IEEE 1995 Custom Integrated Circuits Conference, pp. 22.7.1-22.7.4. 4 pages.
Lee et al., "TP 15.3: A 90mW 4Gb/s Equalized I/O Circuit with Input Offset Cancellation," IEEE International Solid-State Circuits Conference, Feb. 8, 2000, pp. 252-253. 2 pages.
Lewis, Dave, "Easy-to-Use LVDS Serdes for the Serdes Neophyte," National Semiconductor, Jun. 16, 2003. 5 pages.
Nakamura et al., "A 6 Gbps CMOS Phase Detecting DEMUX Module Using Half-Frequency Clock," 1998 Symposium on VLSI Circuits Digest of Technical Papers, pp. 196-197. 2 pages.
Nakase et al., "Source-Synchronization and Timing Vernier Techniques for 1.2 GB/s SLDRAM Interface," IEEE Journal of Solid-State Circuits, vol. 34, No. 4, Apr. 1999, pp. 494-501. 8 pages.
Paris et al., "WP 24.3: A 800 Mb/s 72 Mb SLDRAM with Digitally-Calibrated DLL," ISSCC, 0-7803-5129-0/99, Slide Supplement, IEEE, 1999. 10 pages.
Poulton et al., "A Tracking Clock Recovery Receiver for 4Gb/s Signaling," Hot Interconnects '97, Aug. 21-23, 1997, Palo Alto, CA, pp. 1-13. 14 pages.
Rambus Inc., "Direct Rambus Long Channel Design Guide," 2000. 48 pages.
Rambus Inc., "Direct Rambus Short Channel Layout Guide," Version 0.95, Aug. 2001. 52 pages.
Rambus, Inc. "RDRAM Direct Rambus Clock Generator," Apr. 2002. 22 pages.
RaSer™X Product Brief, "Highly Flexible 10 Gbps Backplane Serial Link Interface," Copyright 2003, Rambus, Inc. 2 pages.
RDRAM® Overview, "High Performance Memory Interface Solution," Copyright 2003, Rambus, Inc. 4 pages.
Redwood Technology Brief, "High Performance Parallel Bus Interface Technology," Copyright 2003, Rambus, Inc. 2 pages.
SLDRAM Inc., "SLD4M18DR400 4 MEG X 18 SLDRAM: 400 Mb/s/pin SLDRAM 4 M x 18 SLDRAM Pipelined, Eight Bank, 2.5 V Operation," Jul. 9, 1998. 69 pages.
Supplementary EP Search Report dated Apr. 17, 2007 in EP Application No. 05706081.6. 3 pages.
TW Office Action dated May 11, 2011 re TW Application No. 094101310. 13 pages.
TW Response dated Aug. 12, 2011 to the Office Action dated May 11, 2011 re TW Application No. 94101310. 30 pages.
Widmer et al., "A DC-Balanced, Partitioned-Block, 8B/10B Transmission Code," IBM J. Res. Develop., vol. 27, No. 5, Sep. 1983, pp. 440-451. 12 pages.
Win et al., "Impulse Radio: How It Works," IEEE Communications Letters 2, vol. 2, Feb. 1998, pp. 36-38. 3 pages.
Yang, Chih-Kong Ken, "Design of High-Speed Serial Links in CMOS," Technical Report No. CSL-TR-98-775, Dec. 1998, pp. 1-182. 94 pages.
Yellowstone Technology Brief, "High Performance Memory Interface Technology," Copyright 2003, Rambus, Inc. 2 pages.
Zerbe, Jared, U.S. Appl. No. 09/776,550, filed Feb. 2, 2001, "Method and Apparatus for Evaluating and Calibrating a Signaling System" Application and Figures as Filed. 62 pages.
Zerbe, Jared, U.S. Appl. No. 09/976,170, filed Oct. 21, 2001, "Method and Apparatus for Evaluating and Optimizing a Signaling System" Application and Figures as Filed. 98 pages.

* cited by examiner

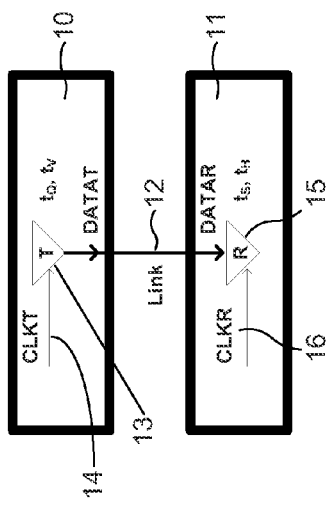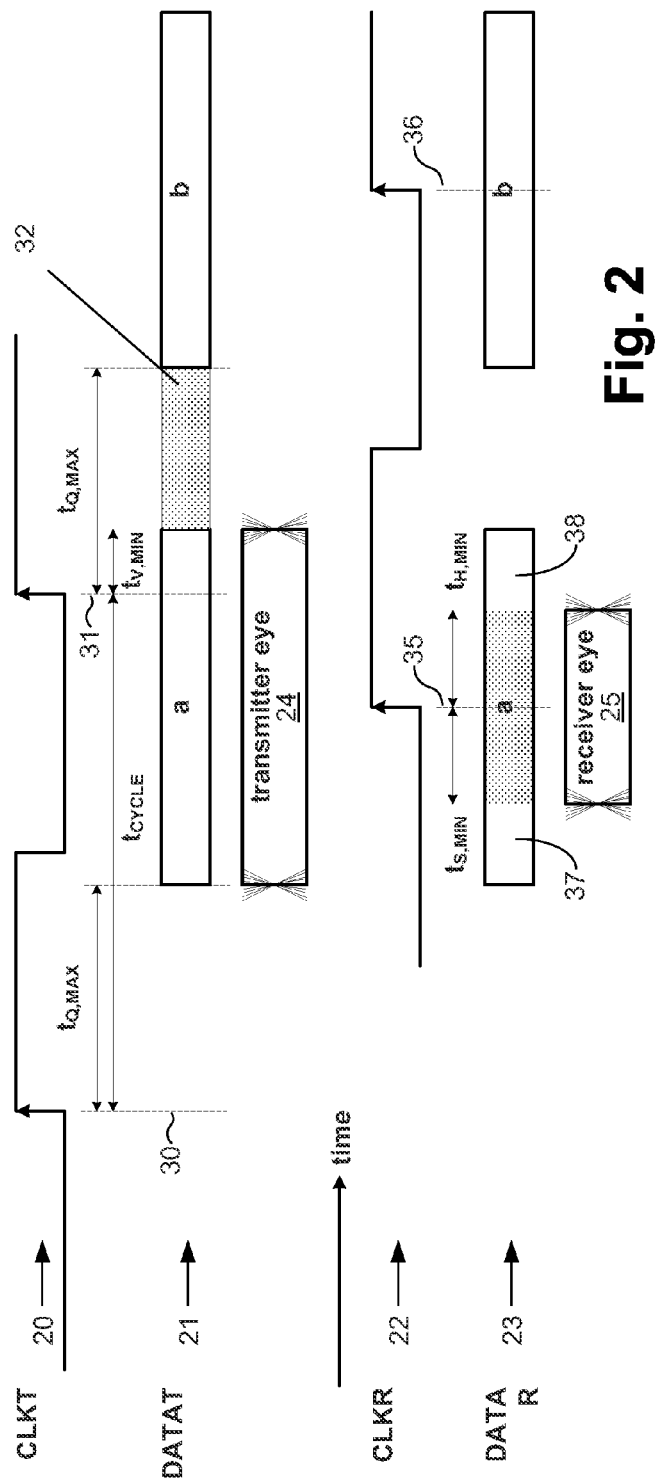

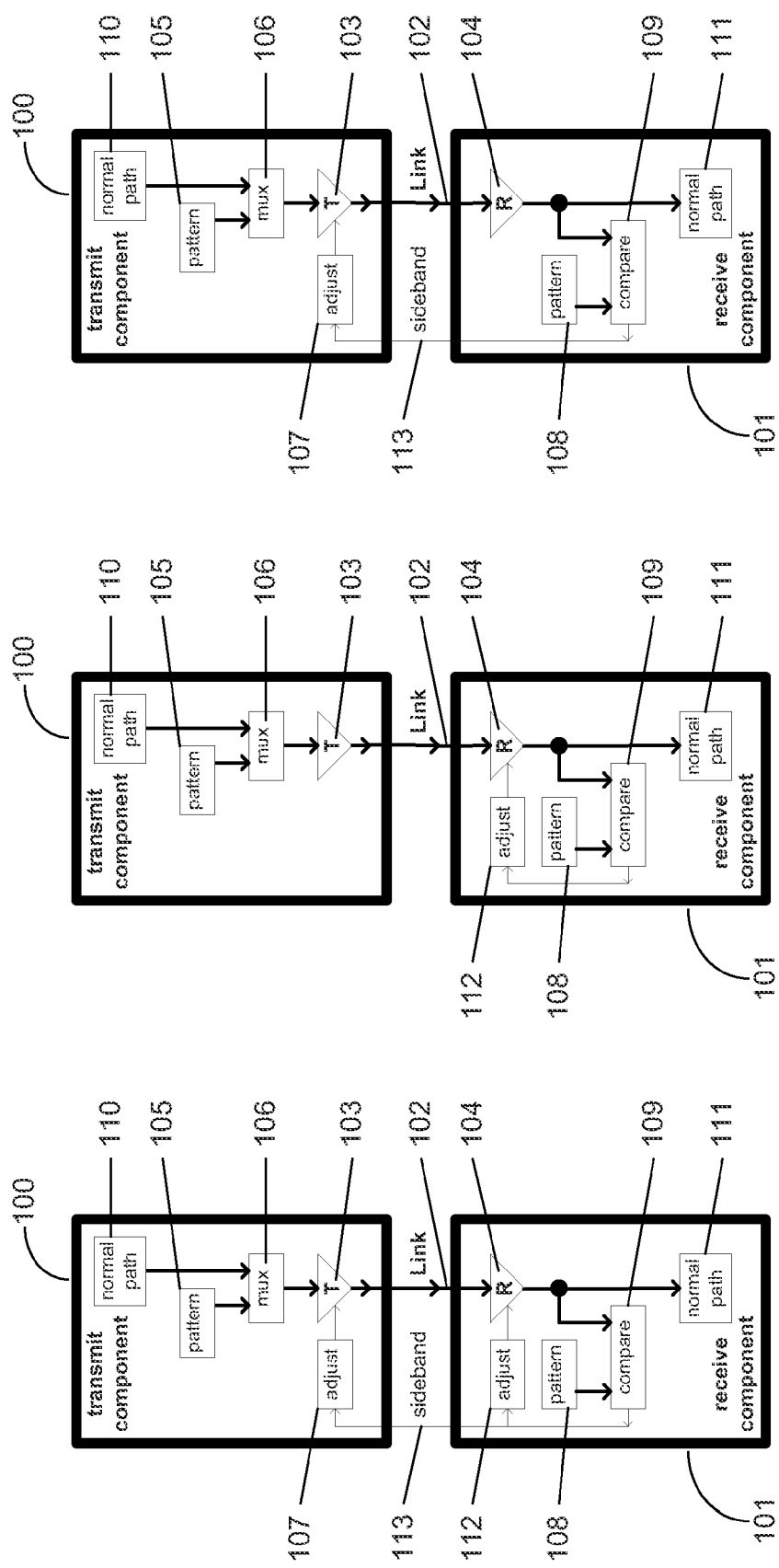

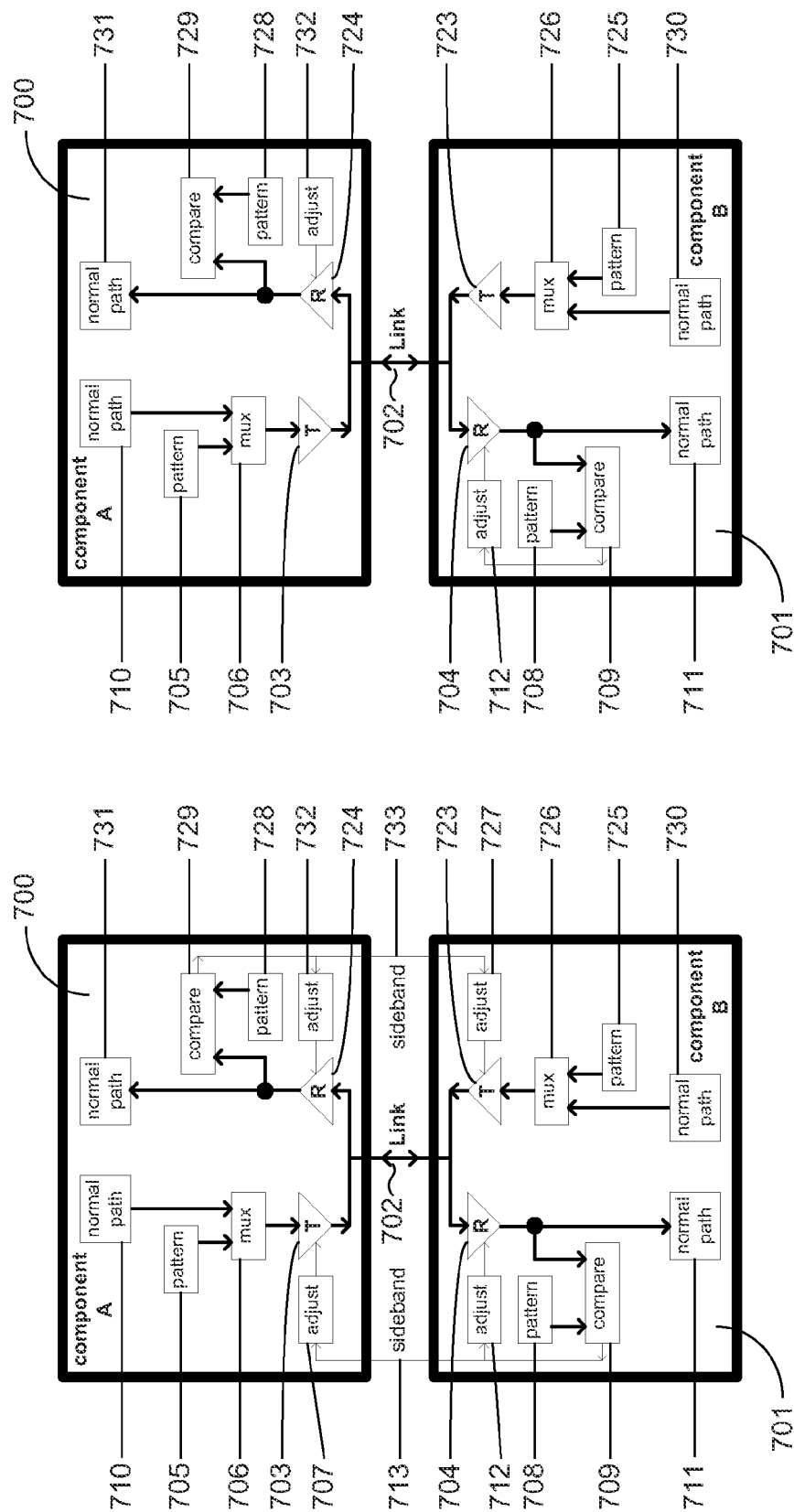

PERIODIC CALIBRATION FOR COMMUNICATION CHANNELS BY DRIFT TRACKING

CROSS REFERENCE TO RELATED APPLICATIONS

The present application is a continuation of co-pending U.S. patent application Ser. No. 13/452,543, filed 20 Apr. 2012; which application is a continuation of U.S. patent application Ser. No. 12/173,530, filed 15 Jul. 2008, U.S. Pat. No. 8,165,187; which application is a continuation of U.S. patent application Ser. No. 11/754,107, filed 25 May 2007, U.S. Pat. No. 7,400,671; which is a continuation of U.S. patent application Ser. No. 10/766,761, filed 28 Jan. 2004, U.S. Pat. No. 7,400,670; which prior applications are each entitled PERIODIC CALIBRATION FOR COMMUNICATION CHANNELS BY DRIFT TRACKING and are each incorporated herein by reference.

BACKGROUND OF THE INVENTION

1. Field of the Invention

The present invention relates to the calibration of communication channel parameters in systems, including mesochronous systems, in which two (or more) components communicate via an interconnection link; and to the calibration needed to account for drift of conditions related to such parameters during operation of the communication channels.

2. Description of Related Art

In mesochronous communication channels, typically a reference clock provides frequency and phase information to the two components at either end of the link. A transmitter on one component and a receiver on another component each connect to the link. The transmitter and receiver operate in different clock domains, which have an arbitrary (but fixed) phase relationship to the reference clock. The phase relationship between transmitter and receiver is chosen so that the propagation delay seen by a signal wavefront passing from the transmitter to the receiver will not contribute to the timing budget for signaling rate. Instead, the signaling rate is determined primarily by the drive window of the transmitter and the sample window of the receiver. The signaling rate will also be affected by a variety of second order effects. This system is clocked in a mesochronous fashion, with the components locked to specific phases relative to the reference clock, and with the drive timing point and sample timing point of each link fixed to the phase values that maximize the signaling rate.

These fixed phase values may be determined in a number of ways. A sideband link may accompany a data link (or links), permitting phase information to be passed between transmitter and receiver. Alternatively, an initialization process may be invoked when the system is first given power, and the proper phase values determined by setting a transmitter drive timing point, and executing a calibration sequence that includes passing a calibration pattern or calibration patterns across the actual link to the receiver, and adjusting the receiver sample timing point until the data is successfully sampled at the receiver. Once the drive timing point and sample timing point of each link have been fixed, the system is permitted to start normal operations. The calibration sequences used to establish proper phase values on initialization are designed to provide reliable results over a wide variety of environmental conditions, and a wide variety of operating conditions on the communication link. To provide reliable results, the calibration sequences pass a calibration pattern or calibration patterns that include lots of data and take quite a long time.

The calibration sequences use patterns with long or numerous codes designed to find the worst-case leading edge and the worst-case trailing edge of a passing region for a parameter subject of the calibration, such as drive timing points and sample timing points discussed above. The edge values are a function of many system parameters including for example silicon processing variations, and packaging parameters such as crosstalk, terminal resistance accuracy, system board impedance, module impedance, trace lengths, connector locations, and so on. In addition to the uncertainty of these variables, the patterns necessary to create worst-case inter-symbol interference or resonance can be very long, and are difficult to predict. In order to deal with the uncertainty of which patterns will generate the leading or trailing edge of the worst-case passing region, many systems use a brute force approach to calibration sequences, using sequences with very long calibration patterns. For example, one brute force approach is based on the use of a pseudorandom bit sequence PRBS, which consists of a long, fairly random pattern, to attempt to determine the passing region. Other systems utilize many initialization patterns that are hundreds of bits long to present the worst-case pattern for a given configuration, and attempt to cover all possible conditions.

The use of long, complex patterns is generally adequate if the calibration sequence is run infrequently. For example, if the algorithm is run only during an initial system bring up, the length of the calibration pattern is not generally critical. However, during normal operation, system conditions will change. Ambient temperature, component temperature, supply voltages, and reference voltages will drift from their initial values. Also, spread spectrum clock systems intentionally shift the clock frequency to meet emission standards. As the conditions drift, the optimal timing points of the transmitter and receiver and other parameters will change.

Although the calibration sequences can be run periodically to adjust for drift, the length and complexity of the patterns and the algorithms used in the sequences interfere with mission-critical operations of the system. Primarily, the long calibration sequences with patterns having long or numerous codes require storage, access to the input/output circuits and interconnect, and processing resources in order to complete a calibration sequence. During this recalibration time, the system is unavailable to the application. This creates at least two significant problems. First, performance is reduced, in general. Second, many applications can tolerate only minimum latency addition without under or over running their streaming data.

It is desirable to provide techniques to compensate for the condition drift, and provide improvements in system and component design to permit these techniques to be utilized.

SUMMARY OF THE INVENTION

The present invention takes advantage of a discovery that long-term drift in timing, voltage or other parameters of a communication channel caused for example by temperature change, can be largely independent of the calibration pattern utilized to compute the operation value of the parameter. In other words, drift in a particular parameter can be tracked without using patterns based on long and/or numerous codes required for determining an optimal operation value for the parameter. Rather, a simpler calibration sequence can be applied to track drift of the particular parameter during operation of the device. The simpler calibration sequence used to track drift of the parameter utilizes less of the resources of the communication channel (that is, it occupies the link, transmitter and receiver for less time) than the more exhaustive initial calibration sequence. Changes in the parameter based on computations that arise from the use of a simpler calibration sequence are used to adjust the operation value that was created using the more exhaustive initial sequence. Herein, the operation value is the value, or a function of the value, of the parameter usually used during normal operation of the communication channel.

Accordingly, the present invention provides a system and method for calibrating an operation value for a parameter of a communication channel, which allows for optimizing the operation value of the parameter, while efficiently accounting for drift of properties of the channel. A method for calibrating a communication channel, including a first component having a transmitter, a second component having a receiver, and a communication link coupling the first and second components, the communication channel having a parameter with an operation value determined by calibration, comprises establishing an operation value for a parameter of the communication channel; executing a drift calibration sequence, from time to time, to determine a drift value for the parameter of the communication channel, wherein drift calibration sequence comprises an algorithm different than used to establish the operation value; and updating the operation value in response to the drift value. In embodiments of the invention, the operation value is established by executing a first calibration sequence to set the operation value of the parameter of the communication channel, and wherein the drift calibration sequence utilizes less resources of the communication channel than the first calibration sequence. The first calibration sequence is executed, such as upon initialization of a system, to establish the operation value, which utilizes an algorithm that the designer intends to be exhaustive so that a suitable operation value can be determined for most conditions in which the system is designed to operate. A second calibration sequence is executed to determine a drift value in the parameter, and to update the operation value in response to the drift value. The second calibration sequence is executed from time to time during normal operation of the communication channel, and utilizes less resources of the communication channel than does the first calibration sequence. In one embodiment, the first calibration sequence for measurement of the operation value utilizes a long calibration pattern, such a data set including a code or codes which includes more than 200 bits, a code greater than 30 bytes, and a code based on a pseudorandom bit sequence having a length of $2^N-1$ bits, where N is equal to or greater than 7. The second calibration sequence utilizes a short calibration pattern, such as a fixed code less than 130 bits, such as less than or equal to 16 bytes, and for example as short as 2 bytes long. Thus in embodiments of the invention, the first calibration sequence utilizes many relatively short codes, or combinations of relatively short and longer codes, while the second calibration sequence uses one short code, or a few short codes where the total number of bits used in the second sequence is substantially less than the total number of bits used in the first sequence.

A calibration sequence, in some embodiments, includes a plurality of calibration cycles. The calibration cycles include de-coupling, logically using software or physically using switches, the normal signal source from the transmitter and supplying a calibration pattern in its place. The calibration pattern is transmitted on the link using the transmitter on the first component. After transmitting the calibration pattern, the normal signal source is re-coupled to the transmitter. The calibration pattern is received from the communication link using the receiver on the second component. The received calibration pattern is analyzed, by comparing it to an expected calibration pattern. The comparison indicates a number of errors in the received calibration pattern, which are used to indicate whether the value of the parameter used during the calibration sequence allows successful operation of the communication channel. A calibrated value of a parameter, or drift of a previously established parameter, of the communication channel is determined in response to the analysis of the received calibration pattern or patterns.

Some embodiments of the invention comprise a calibration method, based on the first and second calibration sequences as discussed above, wherein said second calibration sequence includes
    adjusting the parameter to a first edge value;
    transmitting calibration patterns on the communication link using the transmitter on the first component;
    receiving the calibration patterns on the communication link using the receiver on the second component;
    determining whether the received calibration patterns indicate that a new edge value is met, and if not, returning to the adjusting to iteratively execute a next calibration cycle, and if a new edge value is met, then saving data indicating drift of the first edge value; and then
    adjusting the parameter to a second edge value;
    transmitting calibration patterns on the communication link using the transmitter on the first component;
    receiving the calibration patterns on the communication link using the receiver on the second component;
    determining whether the received calibration patterns indicate that a new edge value is met, and if not, returning to the adjusting to iteratively execute a next calibration cycle, and if a new edge value is met, then saving data indicating drift of the second edge value; and
    determining the drift for the parameter in response to a function of the drift of the first and second edge values.

In some embodiments of the invention, the second calibration sequence measures only one of the first and second edge values, or other value related to the operation value, and determines the drift for the parameter in response to a function of the one measured value.

Methods according to some embodiments of the invention comprise
    executing a first calibration sequence;
    the first calibration sequence including iteratively adjusting a value of a first edge parameter, transmitting a long calibration pattern using the transmitter on the first component, receiving the long calibration pattern using the receiver on the second component, and analyzing the received long calibration pattern to determine a value for the first edge parameter;
    the first calibration sequence also including iteratively adjusting a value of a second edge parameter, transmitting a long calibration pattern using the transmitter on the first component, receiving the long calibration pattern using the receiver on the second component, and analyzing the received long calibration pattern to determine a value for the second edge parameter; and
    as a result of the first calibration sequence, determining said operation value for the parameter based on the function of the first and second edge parameters;
    executing a second calibration sequence;
    the second calibration sequence including iteratively adjusting a value of a first edge parameter, transmitting a short calibration pattern using the transmitter on the first component, receiving the short calibration pattern using the receiver on the second component, and analyzing the received short calibration pattern to determine a value for the first edge value;

the second calibration sequence also including iteratively adjusting a value of a second edge parameter, transmitting a short calibration pattern using the transmitter on the first component, receiving the short calibration pattern using the receiver on the second component, and analyzing the received short calibration pattern to determine a value for the second edge value; and as a result of the second calibration sequence, determining said drift for the parameter based on the function of the first and second edge parameters; and updating said operation value based on said drift, wherein the long calibration patterns have lengths of at least 30 bytes, and the short calibration patterns have lengths of 16 bytes, or less.

Other aspects and advantages of the present invention can be seen on review of the drawings, the detailed description and the claims, which follow.

BRIEF DESCRIPTION OF THE DRAWINGS

FIG. 1 is a simplified diagram of two components interconnected by a communication channel.

FIG. 2 is a timing diagram illustrating timing parameters for a communication channel like that shown in FIG. 1.

FIG. 3 illustrates an embodiment of the present invention where both a transmitter drive point and a receiver sample point are adjustable.

FIG. 4 illustrates an embodiment of the present invention where only a receiver sample point is adjustable.

FIG. 5 illustrates an embodiment of the present invention where only a transmitter drive point is adjustable.

FIG. 12 illustrates an embodiment of the present invention where transmitter drive points and receiver sample points on components of a bidirectional link are adjustable.

FIG. 13 illustrates an embodiment of the present invention where receiver sample points on components of a bidirectional link are adjustable.

DETAILED DESCRIPTION

Figure 6:
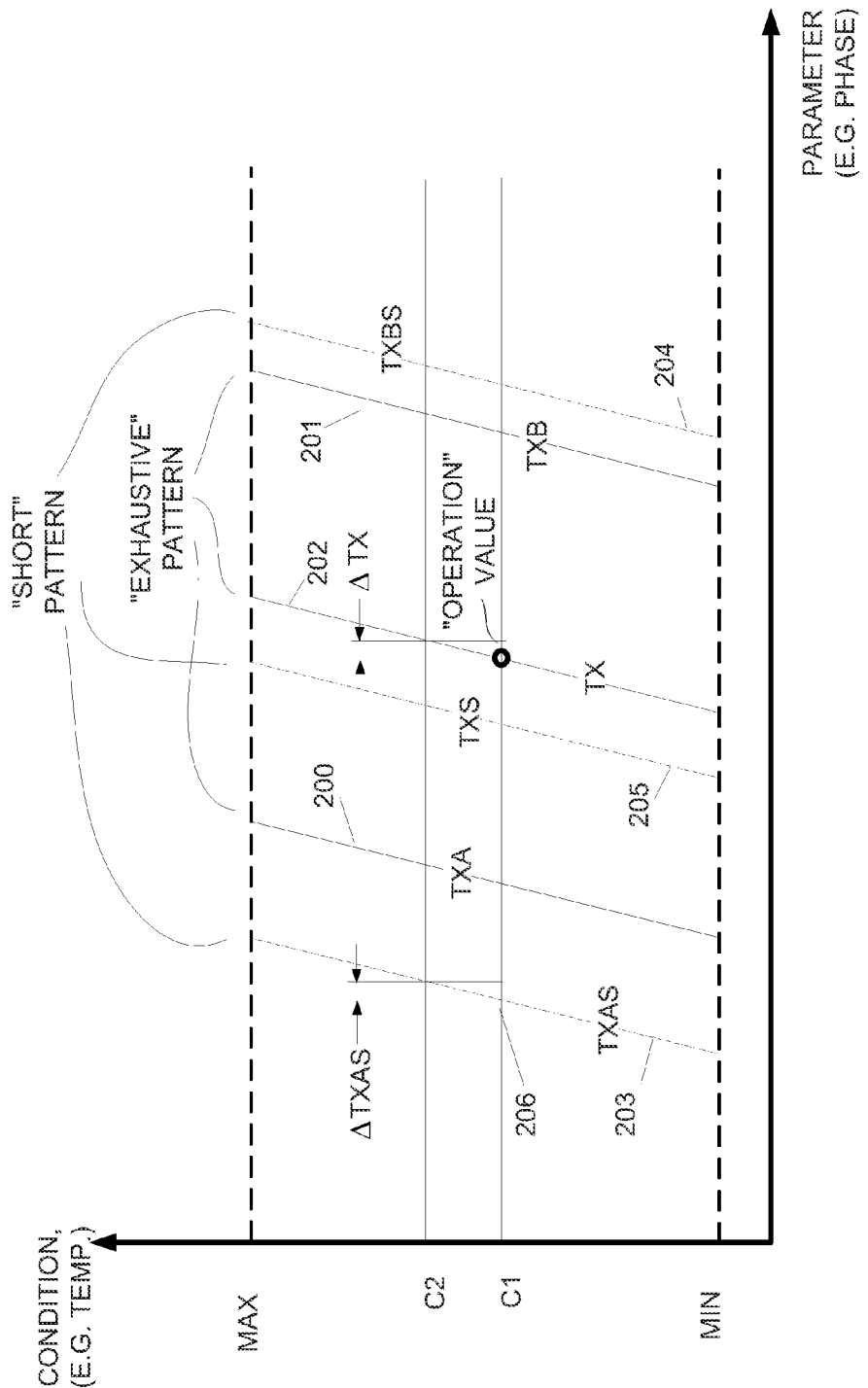
FIG. 6 is a chart illustrating measurement of an operation value and measurement of drift for a transmit clock parameter TX of a communication channel using long and short calibration patterns.

A detailed description of embodiments of the present invention is provided with reference to the Figures.

Transmitter and Receiver Timing Parameters

FIG. 1 shows two components 10, 11 connected with an interconnection medium, referred to as Link 12. One has a transmitter circuit 13 which drives symbols (bits) on Link 12 typically in response to rising-edge timing events on the internal CLKT signal 14. This series of bits forms signal DATAT. The other component 11 has a receiver circuit 15 which samples symbols (bits) on Link 12 typically in response to rising-edge timing events on the internal CLKR signal 16. This series of bits forms signal DATAR. The DATAT and DATAR signals are related; DATAR is an attenuated, time-delayed copy of DATAT. The attenuation and time-delay occur as the signal wavefronts propagate along the interconnection medium of Link 12. The communication channel comprising transmitter 13, link 12 and receiver 15 can be characterized by a plurality of parameters that have an operation value during normal operation of the channel. Representative parameters of the channel include timing parameters specifying the drive times and sample times, voltage levels for drivers and comparators, resistance values such as link termination resistances, driver strength, adaptive equalization coefficients, noise cancellation coefficients, parameters that cause overshoot and undershoot of signals such as driver switching power or speed, and so on. These parameters are affected by or contribute to, drifting flight times, output delays for transmitters, receiver mismatches, input delays, and so on.

FIG. 2 illustrates timing parameters for a mesosynchronous channel, including the transmit clock CLKT signal 14 on trace 20, the transmitter signal DATAT on trace 21, the receive clock CLKR signal 16 on trace 22, and the receiver signal DATAR on trace 23. The transmitter eye 24 and the receiver eye 25 are also illustrated.

The transmitter circuit 13 will begin driving a bit (labeled "a") no later than a time $t_{Q,MAX}$ after a rising edge 30 of CLKT, and will continue to drive it until at least a time $t_{V,MIN}$ after the next rising edge 31. $t_{Q,MAX}$ and $t_{V,MIN}$ are the primary timing parameters of the transmitter circuit 13. These two values are specified across the full range of operating conditions and processing conditions of the communication channel. As a result, $t_{Q,MAX}$ will be larger than $t_{V,MIN}$, and the difference will represent the dead time or dead band 32 of the transmitter circuit 13. The transmitter dead band 32 ($t_{DEAD,T}$) is the portion of the bit timing window (also called bit time or bit window) that is consumed by the transmitter circuit 13:

$$t_{DEAD,T} = t_{Q,MAX} - t_{V,MIN}$$

The edges of the timing window around transition 31 can be defined by:

$$t^{-1} + t_{Q,MAX}, \text{ and}$$

$$t + t_{V,MIN},$$

where $t^{-1}$ is transition 30 one clock cycle earlier than the transition 31, and t is the transition 31.

The receiver circuit 15 will begin sampling a bit (labeled "a") no earlier than a time $t_{S,MIN}$ before a rising edge 35 (or 36) of CLKR, and will continue to sample until no later than a time $t_{H,MIN}$ after the rising edge 35. $t_{S,MIN}$ and $t_{H,MIN}$ are the primary timing parameters of the receiver circuit. These two values are specified across the full range of operating conditions and processing conditions of the circuit. The sum of $t_{S,MIN}$ and $t_{H,MIN}$ will represent the dead time or dead band 37, 38 of the receiver. The receiver dead band 37, 38 ($t_{DEAD,R}$) is the portion of the bit timing window (also called bit time or bit window) that is consumed by the receiver circuit:

$$t_{DEAD,R} = t_{S,MIN} + t_{H,MIN}$$

The edges of the timing window around transition 35 can be defined by:

$$t - t_{S,MIN}, \text{ and}$$

$$t + t_{H,MIN},$$

where t is transition 35.

In this example, the bit timing window is one $t_{CYCLE}$ minus the $t_{DEAD,T}$ and $t_{DEAD,R}$ values, each of which is about ⅓ of one $t_{CYCLE}$ in this example. The remaining ⅓ $t_{CYCLE}$ would account for other uncertainty. Such uncertainty could include, for example, variation in the placement of the rising edges of CLKT and CLKR. In some systems, this variation might be specified as part of the $t_{DEAD,T}$ and $t_{DEAD,R}$ definition. Other uncertainty could include variation in the propagation delay across the interconnection medium.

Unidirectional Link Alternatives

FIG. 3 shows two components 100 (transmit component) and 101 (receive component) connected with an interconnection medium referred to as Link 102. The link is assumed to carry signals in one direction only (unidirectional), so one component 100 has a transmitter circuit 103 coupled to a signal source 110 labeled "normal path," and one component 101 has a receiver circuit 104 coupled to a destination 111 labeled "normal path". There are additional circuits present to permit periodic adjustment of the drive point and sample point in between periods of normal system operation. These adjustments compensate for changes in the system operating conditions.

The transmitter component includes a block 105 labeled "pattern", which can consist of pattern storage, pattern generation circuitry or both, and which is used as a source of transmit calibration patterns for the first and second calibration sequences used according to the present invention. The first calibration sequence in other embodiments is provided by host software across the "normal" data path, while the second calibration sequence is provided by a "pattern" block in the transmitter, and vice versa. Generally, the pattern source can be the same or different, for the first exhaustive calibration sequence and second drift calibration sequence.

In the embodiment shown, a multiplexer block 106 labeled "mux," implemented for example using a logical layer or physical layer switch, enables the transmit calibration pattern set to be driven onto the link by the transmitter circuit. The transmitter drive point can be adjusted by the block 107 labeled "adjust". A sideband communication channel 113 is shown coupled between the component 101 and the component 100, by which the results of analysis of received calibration patterns at the component 101 are supplied to the adjust block 107 of the component 100.

The receiver component 101 includes a block 108 labeled "pattern", which can consist of host software, pattern storage or pattern generation circuitry, and which is used as a source of expected patterns. A block 109 labeled "compare" enables the received pattern set to be compared to the expected pattern set, analyzes the result and causes an adjustment to be made to either the transmitter or receiver. The receiver sample point can be adjusted by the block 112 labeled "adjust".

FIG. 4 shows two components 100, 101 connected with a unidirectional link 102, in which components of FIG. 3 are given like reference numerals. In the embodiment of FIG. 4, only the receiver sample point can be adjusted; the transmitter drive point remains fixed during system operation. Thus, there is no adjust block 107 in the component 100, nor is there a need for sideband communication channel 113 of FIG. 4.

FIG. 5 shows two components 100, 101 connected with a unidirectional link 102, in which components of FIG. 3 are given like reference numerals. In the embodiment of FIG. 5, only the transmitter drive point can be adjusted; the receiver sample point remains fixed during system operation. Thus, there is no adjust block 112 in the component 101 of FIG. 5.

In general, periodic timing calibration can be performed on all three examples, since timing variations due to condition drift can be compensated at either the transmitter end or the receiver end. In practice, it is cheaper to put the adjustment circuitry at only one end of the link, and not at both ends, so systems of FIG. 4 or 5 would have an advantage. Also, it should be noted that the system of FIG. 4 does not need to communicate information from the "compare" block 109 in the receiver component 101 back to the transmitter component 100, and thus might have implementation benefits over the system of FIG. 5. In practical applications, it is generally preferable to calibrate the receiver first and then use this setting to perform transmitter calibration. One method of breaking the chicken-and-egg problem is to load a known transmit pattern via a sideband interface to both sides of the channel. Having matching patterns on both sides, we can now perform an receive sample point calibration. Then, after the receiver offset is set to a reliable value, we can perform initial transmit drive point calibration.

FIG. 6 is a chart illustrating the measured values of a transmit drive timing point parameter using an exhaustive calibration sequence, as compared to the measured values of the same parameter using a short calibration sequence as discussed above. In FIG. 6, the conditions causing drift are plotted on the vertical axis, while the changes in the parameter are plotted on the horizontal axis. In the example illustrated, the condition causing drift is temperature, and the parameter being measured is the phase of the transmit drive point TX. As illustrated, the exhaustive calibration sequence computes edge values TXA and TXB on traces 200 and 201, so that the operation value TX as shown on trace 202 can be computed as a function of the edge values. In this case, the exhaustive calibration sequence utilizes a long calibration pattern including a pseudorandom bit sequence having a length $2^N - 1$, where N is at least 7, and N is 15 in one embodiment. Using a long pseudorandom bit sequence, the exhaustive center of the edge values TXA, TXB and the operation value TX are determined. In FIG. 6, the short calibration sequences are used to track drift, where the short sequences comprise a simple two-byte code or set of two byte (16 bit) codes, such as AAAA, 5555 or 0F0F (hexadecimal). As can be seen, the edge values TXAS and TXBS as measured using the short calibration sequences are plotted on traces 203 and 204. The operation value TXS, if it were based simply on the edge values TXAS and TXBS for the short calibration sequences would be on the trace 205. However, as shown in FIG. 6, the relationship between the condition on the vertical axis and the edge values TXAS, TXBS for the short calibration patterns along the horizontal axis has the same slope as the relationship between the condition and the operation value TX determined using the long calibration patterns. As shown in FIG. 6, if at calibration point C1, the operation value is established at TX, the edge value for TXAS determined using the short patterns has the value represented by point 206. At calibration point C2, the edge value TXAS drifts from point 206 on the horizontal axis by a drift value ΔTXAS. Likewise, the operation value TX drifts by a drift value ΔTX. To the extent the slope of trace 202 for the value TX is the same as, or otherwise correlates with, the slope of trace 203 for the value TXAS, the drift value ΔTXAS can be applied directly to estimate the drift ΔTX, and to update the operation value TX without executing an exhaustive calibration sequence. A similar relationship exists in the graph of FIG. 6, between TXAB and TX, and between TXS and TX. That is the drift of TX is a function of the drift of TXAS alone, TXBS alone, or of a combination of TXAS and TXBS. Thus, by measuring changes in one or both of the edge values of the parameter using a short calibration pattern, and applying those changes to changing the operation value computed using a long calibration pattern, the operational center for the parameter can be adjusted to account for drift utilizing less resources of the communication channel.

Figure 7:
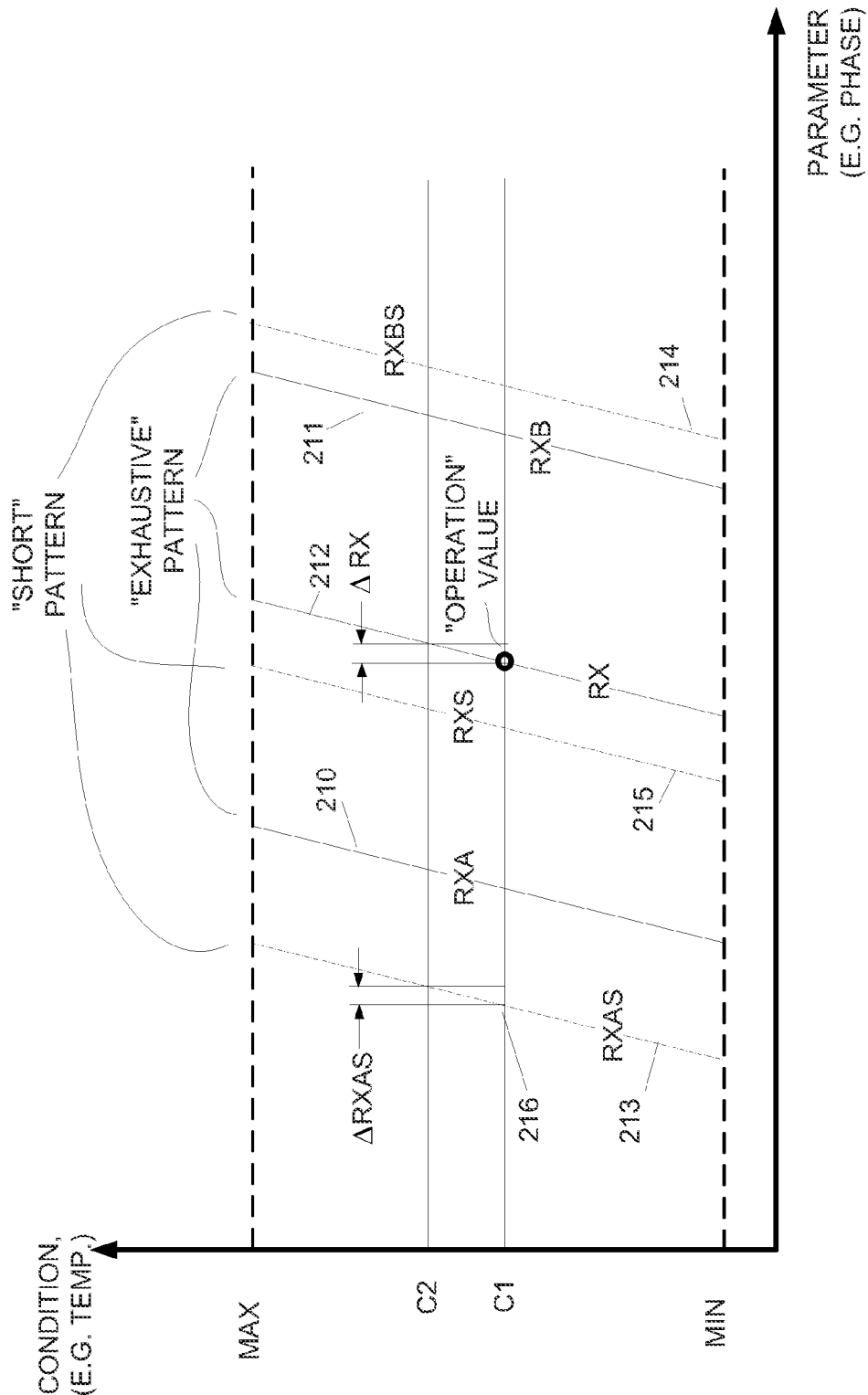
FIG. 7 is a chart illustrating measurement of an operation value and measurement of drift for a receive clock parameter RX of a communication channel using long and short calibration patterns.

FIG. 7 is a chart illustrating the measured values of a receive sample timing point parameter using an exhaustive calibration sequence, as compared to the measured values of the same parameter using a short calibration sequence. In FIG. 7, the conditions causing drift are plotted on the vertical axis, while the changes in the parameter are plotted on the horizontal axis. In the example illustrated, the condition causing drift is temperature, and the parameter being measured is the phase of the transmit drive point RX. As illustrated, the exhaustive calibration sequence computes edge values RXA and RXB on traces 210 and 211, so that the operation value RX as shown on trace 212 can be computed as a function of the edge values. In this case, the exhaustive calibration sequence utilizes a long calibration pattern including a pseudorandom bit sequence having a length $2^N-1$, where N is at least 7, and N is 15 in one embodiment. Using a long pseudorandom bit sequence, the exhaustive center of the edge values RXA, RXB and the operation value RX are determined. In FIG. 7, the short calibration sequences are used to track drift, where the short sequences comprise a simple two-byte code or set of two byte (16 bit) codes, such as AAAA, 5555 or 0F0F (hexadecimal). As can be seen, the edge values RXAS and RXBS as measured using the short calibration sequences are plotted on traces 213 and 214. The operation value RXS, if it were based simply on the edge values RXAS and RXBS for the short calibration sequences would be on the trace 215. However, as shown in FIG. 7, the relationship between the condition on the vertical axis and the edge values RXAS, RXBS for the short calibration patterns along the horizontal axis has the same slope as the relationship between the condition and the operation value RX determined using the long calibration patterns. As shown in FIG. 7, if at calibration point C1, the operation value is established at RX, the edge value for RXAS determined using the short patterns has the value represented by point 216. At calibration point C2, the edge value RXAS drifts from point 216 on the horizontal axis by a drift value ΔRXAS. Likewise, the operation value RX drifts by an drift value ΔRX. To the extent the slope of trace 212 for the value RX is the same as, or otherwise correlates with, the slope of trace 213 for the value RXAS, the drift value ΔRXAS can be applied directly to estimate the drift ΔRX, and to update the operation value RX without executing an exhaustive calibration sequence. A similar relationship exists in the graph of FIG. 7, between RXAB and RX, and between RXS and RX. That is the drift of RX is a function of the drift of RXAS alone, RXBS alone, or of a combination of RXAS and RXBS. Thus, by measuring changes in one or both of the edge values of the parameter using a short calibration pattern, and applying those changes to changing the operation value computed using a long calibration pattern, the operational center for the parameter can be adjusted to account for drift utilizing less resources of the communication channel.

The function of the drift in the edge value measured using the short calibration pattern, and the drift in the operation value using the long calibration pattern in the examples of FIG. 6 and FIG. 7, are linear, or approximately linear. In other examples, the function may be more complex, and/or the value measured using the short patterns may be different than those shown. However, so long as the drift in the value measured using the short calibration pattern, and the drift in the operation value using the long calibration pattern, are correlated, whether causally or not, then the values measured using the short calibration pattern can be applied for adjustment of the operation value of parameter.

Accordingly, the operation value of the parameter can be established, such as by using an exhaustive calibration routine based on long calibration patterns, during startup or initialization of the system. Adjustments in the operation value due to drift, however, can be made based upon shorter calibration sequences adapted to determine a drift value, such as those based on short calibration patterns. The shorter drift calibration sequences can be executed from time to time, such as on a set periodic basis, when signaled by an external monitor of the conditions of operation, or at times depending on other conditions of use of the communication channel, without utilizing as much of the resources of the communication channel as are needed for the more exhaustive calibration routine utilized less frequently, such as only during startup.

Calibration Steps for Transmitter for Unidirectional Link

Figure 8:
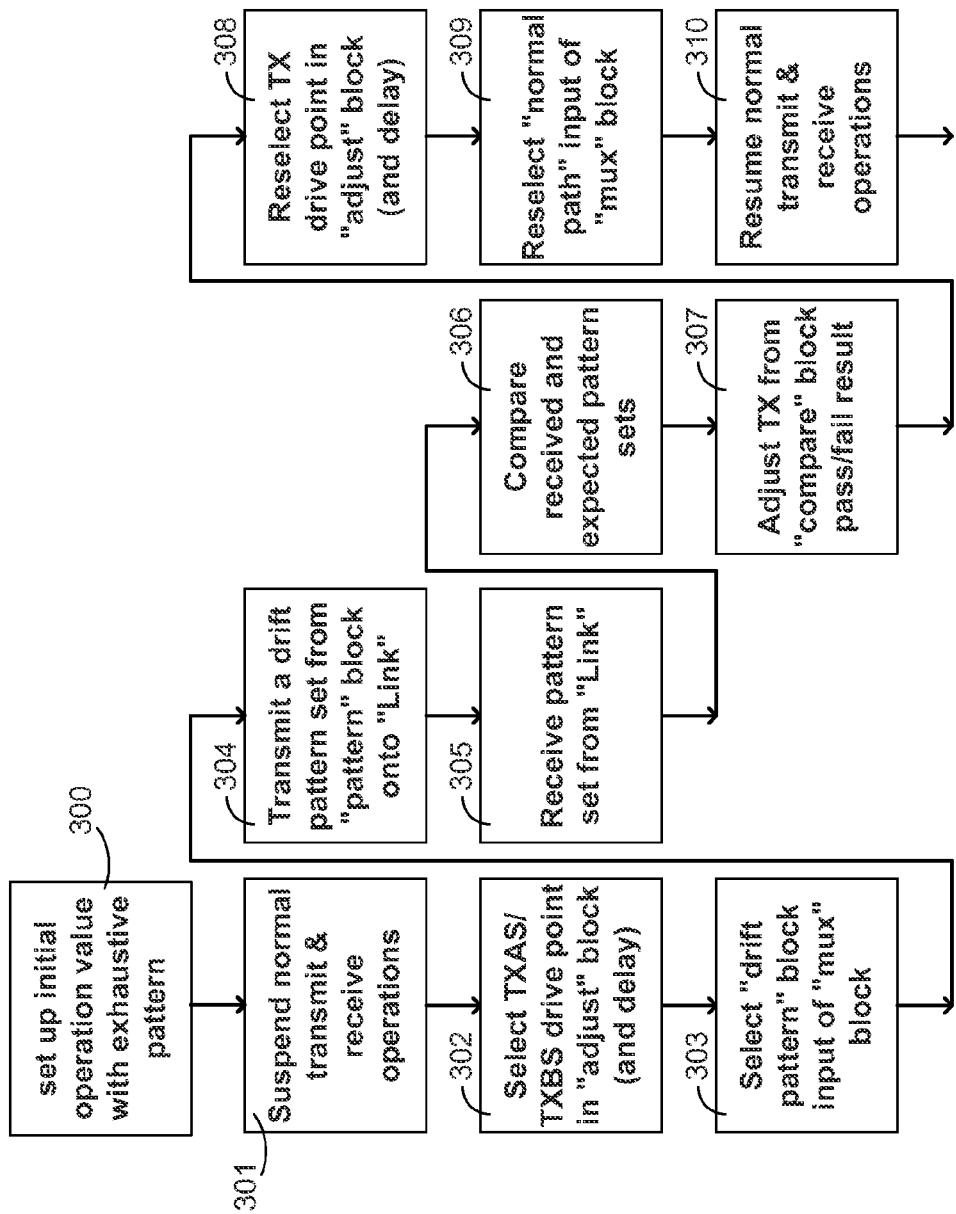
FIG. 8 is a flow chart illustrating calibration steps for a transmitter on a unidirectional link for a transmitter drive point.

FIG. 8 shows calibration steps for the example system shown in FIG. 5.

(Step 300) Execute a first calibration sequence on initialization or other event to establish an operation value for the transmit drive point, based on long calibration patterns or more exhaustive routines.

(Step 301) Periodically, or upon an event indicating that a drift measurement is due, suspend transmit and receive operations that are in progress.

(Step 302) Change the drive point of the transmit component from the "TX" operation value (used for normal operations) to either the "TXAS" or "TXBS" edge value (used for drift calibration operations) in the "adjust" block. It may be necessary to impose a settling delay at this step to allow the new drive point to become stable.

(Step 303) Change "mux" block of the transmit component so that the "pattern" block input is enabled.

(Step 304) A pattern set is created in the "pattern" block of the transmit component and is transmitted onto the "link" using the TXAS or TXBS drive point.

(Step 305) The pattern set is received in the receive component. Note that the sample point of the receiver is fixed relative to the reference clock of the system and is not adjusted.

(Step 306) The received pattern set is compared in the "compare" block to the expected pattern set produced by the "pattern" block in the receive component. The two pattern sets will either match or not match. As a result of this comparison (and possibly other previous comparisons) a pass or fail determination will be made.

(Step 307) Adjust either the "TXAS" or "TXBS" edge value in the transmit component as a result of the pass or fail determination. The drift in the "TX" operation value in the transmit component is indicated by a function of the adjusted TXAS and TXBS values. The "TX" value is also adjusted based on that function. This adjustment may only be made after a calibration sequence including transmission of two or more of calibration patterns has been executed, in order to ensure some level of repeatability. Also, "low pass" filtering may be applied to measurements of drift or of the operation value, to prevent dithering of the operation value.

(Step 308) Change the drive point of the transmitter from the "TXAS" or "TXBS" edge value (used for calibration operations) to new "TX" operation value (used for normal operations) in the "adjust" block of the transmit component. It may be necessary to impose a settling delay at this step to allow the new drive point to become stable.

(Step 309) Change "mux" block of the transmit component so that the "normal path" input is enabled.

(Step 310) Resume normal transmit and receive operations.

The first calibration sequence in one embodiment is an iteration just like that discussed above with respect to steps 301-310, with the exception that the calibration pattern for the first cycle is a long pattern, and the calibration pattern for the second calibration sequence is a short pattern. For example, a pseudorandom bit sequence having a length $2^N-1$, with N equal to 7 or N equal to 15, can be used as the long calibration pattern for the first calibration sequence. In another example, the long calibration pattern is a set of short patterns intended to be an exhaustive set for conditions, such as inter-symbol interference patterns, of the communication channel. The short calibration pattern on the other hand, may be a simple two-byte code or set of two byte (16 bit) codes, such as AAAA, 5555 or 0F0F (hexadecimal).

In some embodiments, the exhaustive calibration sequence may use the same codes as the simpler calibration sequence, but apply shorter algorithms for computing adjustments. For, example, the values may be adjusted without requiring repeatability, or requiring less repeatability, when measuring drift than when measuring the exhaustive operation value.

Timing for Iteration Step for Transmit

Figure 9:
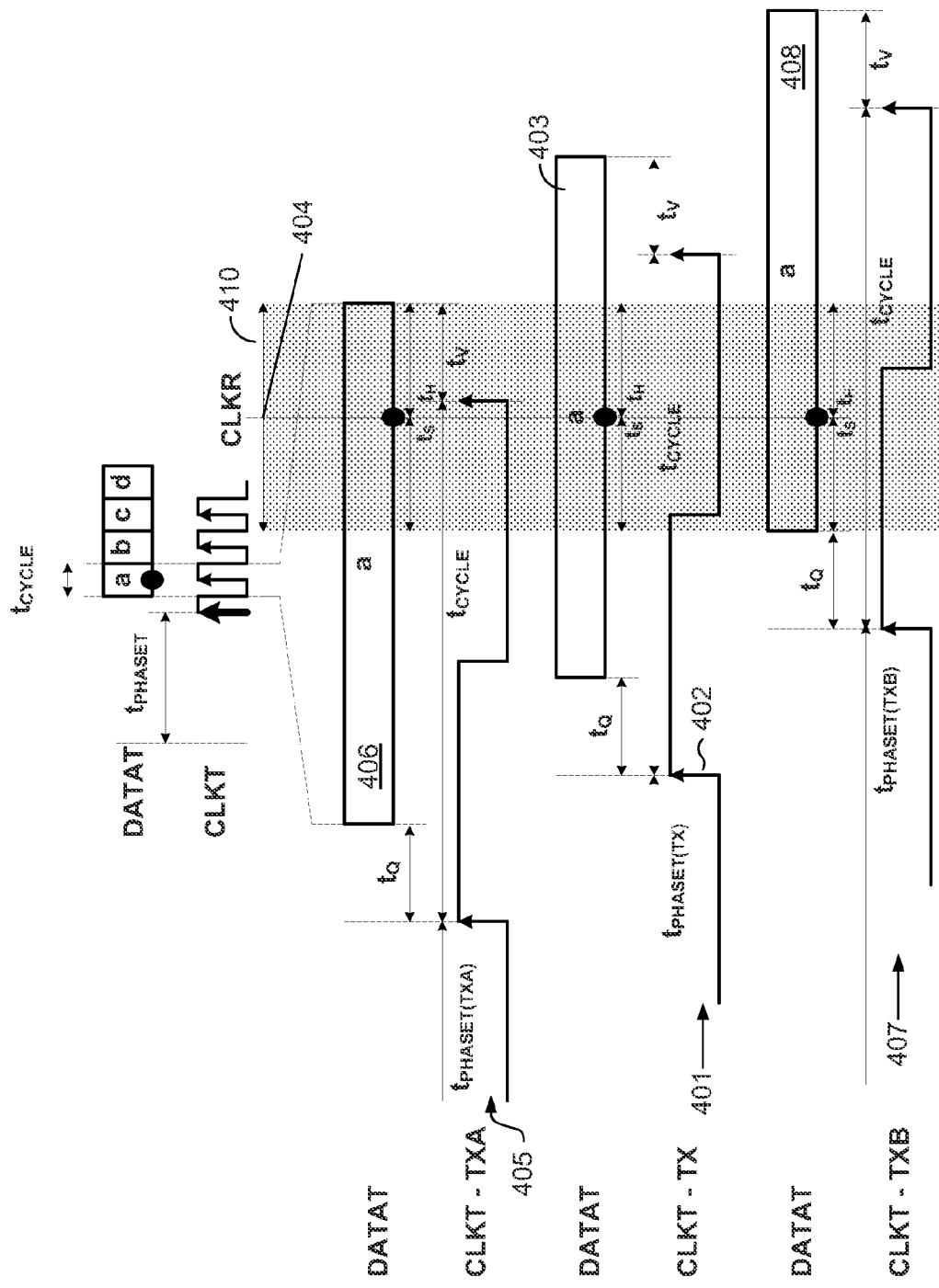
FIG. 9 illustrates timing for iteration steps for calibrating a transmitter drive point.

FIG. 9 includes the timing waveforms used by the exhaustive calibration steps to determine an operation value, similar to the calibration sequence shown in FIG. 8 for determining drift in a system like that of FIG. 5. These timing waveforms are similar to those from FIG. 1, except that the drive point is adjusted to straddle the sampling window of the receiver in order to track the edges of the valid window of the transmitter, and illustrate one example calibration procedure. During a drift calibration sequence, the edge values of FIG. 9, ($t_{PHASET(TXA)}$ and $t_{PHASER(TXB)}$) are replaced by correlated values determined using the short calibration sequences.

The "adjust" block in the transmit component maintains three values in storage: TXA, TX, and TXB. The TX value is the operation value used for normal operation. The TXA and TXB are the "edge" values, which track the left and right extremes of the bit window of the transmitter. Typically, the TX value is initially derived from the average of the TXA and TXB values as determined using an exhaustive calibration sequence, but other relationships are possible.

As described above, drift in the TX value is determined by a function of the TXAS and TXBS values determined during the calibration sequences that use short patterns. The function of TXAS and TXBS used depends on how the parameter drifts as measured by the exhaustive calibration patterns, as compared with how it drifts as measured by the short patterns. So long as this relationship correlates, then the short pattern technique for measuring drift is straight forward. In some systems, the drift in the short pattern measurements is very close to the drift in the long pattern measurements, so that any determined drift can be applied directly to adjust the operation value of the parameter.

The "adjust" block in the transmit component maintains three values in storage: TXA, TX, and TXB for the purposes of the exhaustive calibration sequence illustrated here. For drift calculation, TXAS and TXBS are also stored. The TX value is the operation value used for normal operation. The TXA and TXB are the "edge" values, which track the left and right extremes of the bit window of the transmitter. Typically, the TX value is initially derived from the average of the TXA and TXB values, but other relationships are possible. The TXA and TXB values can be maintained by the calibration operations, which from time to time, and periodically in some embodiments, interrupt normal operations for exhaustive calibration sequences. However, in embodiments of the present invention, storage of TXA and TXB may not be needed to track drift.

In FIG. 9, the position of the rising edge of CLKT has an offset of $t_{PHASET}$ relative to a fixed reference (typically a reference clock that is distributed to all components).

When the TX value is selected ($t_{PHASET(TX)}$ in the middle trace 401 showing CLKT timing waveform) for operation, the rising edge 402 of CLKT causes the DATAT window 403 containing the value "a" to be aligned so that the DATAR signal (not shown but conceptually overlapping with the DATAT signal) at the receiving component is aligned with the receiver clock, successfully received, and ideally centered on the receiver eye.

When the TXA value is selected ($t_{PHASET(TXA)}$ in the top trace 405 showing CLKT timing waveform), the rising edge of CLKT is set to a time that causes the right edges of the DATAT window 406 (containing "a") and the receiver set/hold window 410 (shaded) to coincide. The $t_S$ setup time and $t_H$ hold time surround the CLKR rising edge, together define the set/hold window 410 (not to be confused with the receiver eye of FIG. 2) in which the value of DATAR must be stable for reliable sampling around a given CLKR rising edge 404. Since the DATAT window, and the resulting DATAR window, are larger than this set/hold window 410, the transmitter has timing margin. However, in the case shown on trace 405 with the transmit clock rising edge at offset $t_{PHASET(TXA)}$, all the timing margin is on the left side of the transmitter eye for the set/hold window 410, adding delay after the $t_Q$ timing parameter. There is essentially no margin for the $t_V$ timing parameter in the trace 405, so that the offset defines the left edge of the calibration window.

The calibration process for TXA will compare the received pattern set to the expected pattern set, and determine if they match. If they match (pass) then the TXA value will be decremented (the $t_{PHASET(TXA)}$ offset becomes smaller shifting the transmit window 406 to the left in FIG. 9) or otherwise adjusted, so there is less margin for the $t_V$ timing parameter relative to the receiver window 410. If they do not match (fail) then the TXA value will be incremented (the $t_{PHASET(TXA)}$ offset becomes larger shifting the transmit window 406 to the right in FIG. 9) or otherwise adjusted, so there is more margin for the $t_V$ timing parameter.

As mentioned earlier, the results of a sequence including transmission of two or more calibration patterns may be accumulated before the TXA value is adjusted. This would improve the repeatability of the calibration process. For example, the calibration pattern could be repeated "N" times with the number of passes accumulated in a storage element. If all N passes match, then the TXA value is decremented. If any of the N passes do not match, then the TXA value is determined to have reached the edge of the window and is incremented. In another alternative, after the Nth pattern, the TXA value could be incremented if there are fewer than N/2 (or some other threshold number) passes, and decremented if there are N/2 or more passes.

When TXA is updated, the TX value will also be updated. In this example, the TX value will updated by half the amount used to update TXA, since TX is the average of the TXA and TXB values. If TX has a different relationship to TXA and TXB, the TX update value will be different. Note that in some embodiments, the TX value will need slightly greater precision than the TXA and TXB values to prevent round-off error. In alternate embodiments, the TX value can be updated after pass/fail results of TXA and TXB values have been determined. In some cases, these results may cancel and produce no change to the optimal TX value. In other cases these results may be accumulated and the accumulated results used to determine an appropriate adjustment of the TX setting. According to this embodiment, greater precision of the TX setting relative to the TXA and TXB settings may not be required.

When the TXB value is selected ($t_{PHASER(TXB)}$ in the bottom trace 407 showing a CLKT timing waveform) for calibration, the rising edge of CLKT is set to a time that causes the left edge of the transmitter valid window 408 (containing "a") and the receiver set/hold window 410 (shaded) to coincide. In this case with the transmit clock rising edge at $t_{PHASER(TXB)}$, all the timing margin is on the right side of the transmit window 408, providing more room than required by the $t_V$ timing parameter. This means that there will be essentially no margin for the $t_Q$ timing parameter on the left side of the window 408, defining the right edge of the calibration window.

The calibration process will compare the received pattern set to the expected pattern set, and determine if they match. If they match (pass) then the TXB value will be incremented (the offset becomes larger) or otherwise adjusted, so there is less margin for the $t_Q$ timing parameter. If they do not match (fail) then the TXB value will be decremented (the offset becomes smaller) or otherwise adjusted, so there is more margin for the $t_Q$ timing parameter.

As mentioned earlier, the results of transmission of two or more calibration patterns may be accumulated before the TXB value is adjusted. For example, transmission of the patterns could be repeated "N" times with the number of passes accumulated in a storage element. After the Nth sequence the TXB value could be decremented if there are fewer than N/2 passes and incremented if there are N/2 or more passes. This would improve the repeatability of the calibration process.

When TXB is updated, the TX value will also be updated. In this example, the TX value will updated by half the amount used to update TXB, since TX is the average of the TXA and TXB values. If TX has a different relationship to TXA and TXB, the TX update value will be different. Note that the TX value will need slightly greater precision than the TXA and TXB values if it is desired to prevent round-off error.

Determination of drift may be made using a similar process, although with different calibration patterns, as explained above.

Calibration Steps for Receiver for Unidirectional Link

Figure 10:
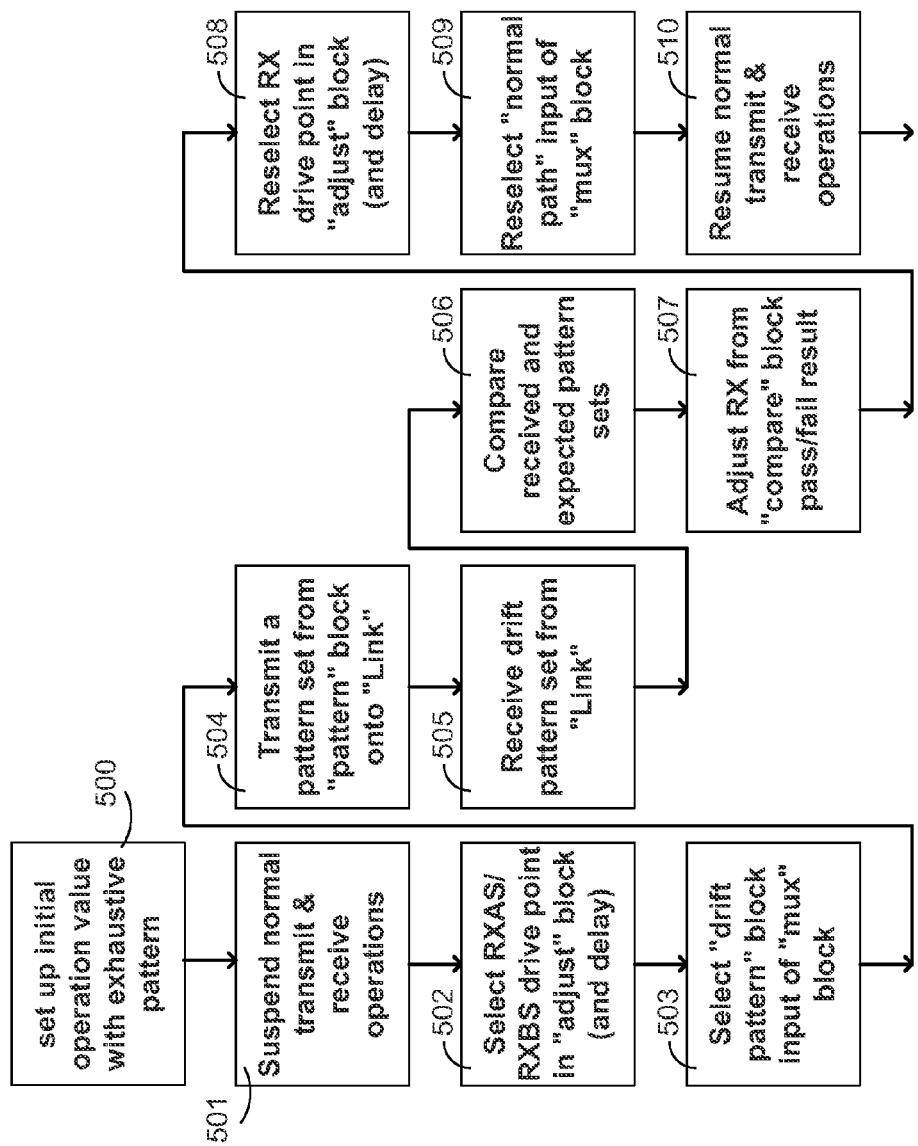
FIG. 10 is a flow chart illustrating calibration steps for a receiver on a unidirectional link for a sample point.

FIG. 10 shows, for a system like the example from FIG. 4, the steps needed to perform a timing calibration update for a receiver. Note that only steps (Block 502), (Block 507), and (Block 508) are different relative to the steps in FIG. 8.

(Step 500) Execute a first calibration sequence on initialization or other event to establish an operation value "RX" for the receive sample point, based on long calibration patterns that are intended to be exhaustive.

(Step 501) Periodically, or upon an event indicating that a drift measurement is due, suspend normal transmit and receive operations that are in progress.

(Step 502) Change the sample point of the receive component from the "RX" operation value (used for normal operations) to either the "RXAS" or "RXBS" edge value (used for calibration operations) in the "adjust" block. It may be necessary to impose a settling delay at this step to allow the new sample point to become stable.

(Step 503) Change "mux" block of the transmit component so that the "pattern" block input is enabled.

(Step 504) A pattern set is created in the "pattern" block of the transmit component and is transmitted onto the "link" using the TX drive point. The pattern set includes one or more short codes, for example one or more 2-byte codes.

(Step 505) The pattern set is received in the receive component.

(Step 506) The received pattern set is compared in the "compare" block to the expected pattern set produced by the "pattern" block in the receive component. The two pattern sets will either match or not match. As a result of this comparison (and possibly other previous comparisons) a pass or fail determination will be made.

(Step 507) Adjust either the "RXAS" or "RXBS" edge value in the receive component as a result of the pass or fail determination. The drift in the "RX" operation value in the transmit component is indicated by a function of the adjusted RXAS and RXBS values. The "RX" value is also adjusted based on that function. This adjustment may only be made after two or more of these calibration sequences have been executed, in order to ensure some level of repeatability.

(Step 508) Change the sample point of the receiver from the "RXAS" or "RXBS" edge value (used for calibration operations) to "RX" operation value (used for normal operations) in the "adjust" block of the receive component. It may be necessary to impose a settling delay at this step to allow the new drive point to become stable.

(Step 509) Change "mux" block of the transmit component so that the "normal path" input is enabled.

(Step 510) Resume normal transmit and receive operations.

The first calibration sequence in one embodiment is an iteration just like that discussed above with respect to steps 501-510, with the exception that the calibration pattern for the first cycle is a long pattern, and the calibration pattern for the second calibration sequence is a short pattern. For example, a pseudorandom bit sequence having a length $2^N-1$, with N equal to 7 or N equal to 15, can be used as the long calibration pattern for the first calibration sequence. In another example, the long calibration pattern is a set of short patterns intended to be an exhaustive set for conditions, such as inter-symbol interference patterns, of the communication channel. The short calibration pattern on the other hand, may be a simple two-byte code or set of two-byte codes, such as AAAA, 5555 or 0F0F.

Timing for Iteration Step for Receive

Figure 11:
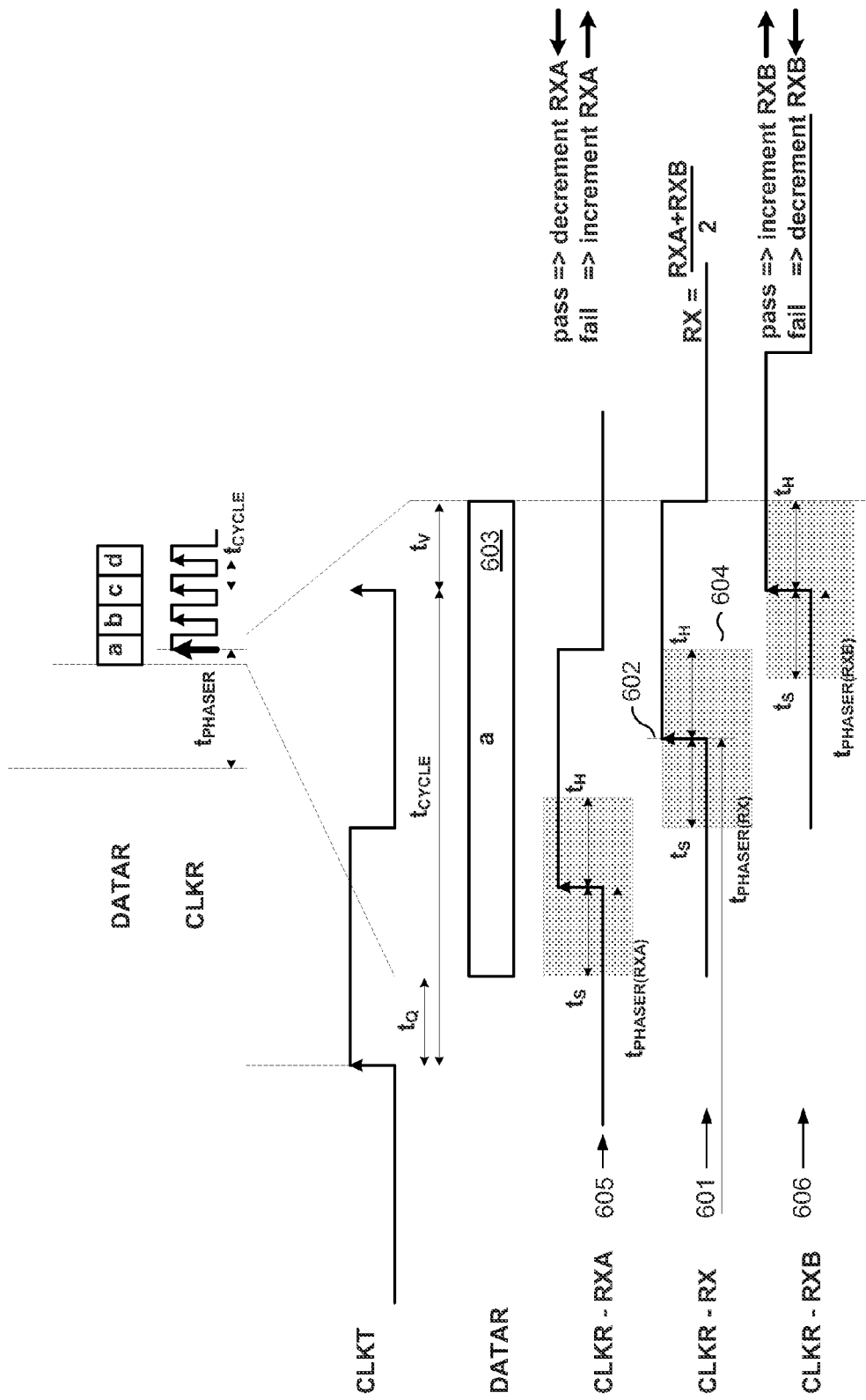
FIG. 11 illustrates timing for iteration steps for calibrating a receiver sample point.

FIG. 11 shows the exhaustive calibration steps to determine an operation value, similar to the calibration sequence shown in FIG. 8 for determining drift of the operation value, in a system like that of FIG. 4. These timing waveforms are similar to those from FIG. 1, except that the sampling point is adjusted within the bit window in order to track the edges of the window. During a drift calibration sequence, the edge values of FIG. 11, ($t_{PHASET(RXA)}$ and $t_{PHASER(RXB)}$) are replaced by correlated values determined using the short calibration sequences.

The "adjust" block in the receive component maintains three values in storage: RXA, RX, and RXB for the purpose of the exhaustive calibration sequence. The RX value is the operation value used for normal operation. The RXA and RXB are the "edge" values, which track the left and right extremes of the bit window. The RX value is derived from the first exhaustive calibration sequence, and based on the average of the RXA and RXB values determined in the first calibration sequence, but other relationships are possible. The RXAS and RXBS values are determined in the second calibration sequence using the short calibration patterns, and maintained by the calibration operations which periodically interrupt normal operations. Changes in the RXAS and RXBS values, or in only one of them, are used to determine a drift in the RX values. The RX value is updated based on that drift.

In the timing diagrams, the position of the rising edge of CLKR has an offset of $t_{PHASER}$ relative to a fixed reference (not shown, typically a reference clock that is distributed to all components). This offset is determined by the RXA, RX, and RXB values that are stored.

When the RX value is selected ($t_{PHASER(RX)}$ in the middle trace 601 showing a CLKR timing waveform) for use in receiving data, the rising edge 602 of CLKR is approximately centered in the receiver eye of the DATAR signal containing the value "a". The DATAR signal is the DATAT signal transmitted at the transmitter after propagation across the link, and can be conceptually considered to be the same width as DATAT as shown in FIG. 11. The receiver eye is shown in FIG. 2. The $t_S$ setup time is the minimum time before the clock CLKR rising edge which must be within the DATAR window 603, and the $t_H$ hold time is the minimum time after the clock CLKR rising edge that must be within the DATAR window 603, together defining the set/hold window 604 (not to be confused with the receiver eye of FIG. 2) in which the value of DATAR must be stable for reliable sampling around a given CLKR rising edge. Since the valid window 604 of the DATAR signal is larger than this set/hold window 604, the receiver has timing margin in both directions.

When the RXA value is selected ($t_{PHASER(RXA)}$ in the top trace 605 showing a CLKR timing waveform), the rising edge of CLKR is approximately a time $t_S$ later than the left edge (the earliest time) of the DATAR window 603 containing the value "a". In this case, the CLKR rising edge is on the left edge of the receiver eye, and all the timing margin is on the right side of the set/hold window 604, providing more room than is required by the $t_H$ timing parameter. This means that there will be essentially no margin for the $t_S$ timing parameter, defining the left edge of the calibration window.

The calibration process will compare the received pattern set to the expected pattern set, and determine if they match. If they match (pass) then the RXA value will be decremented (the offset becomes smaller) or otherwise adjusted, so there is less margin for the $t_S$ timing parameter. If they do not match (fail) then the RXA value will be incremented (the offset becomes larger) or otherwise adjusted, so there is more margin for the $t_S$ timing parameter.

As mentioned earlier, the results of transmission and reception of two or more calibration patterns may be accumulated before the RXA value is adjusted. For example, the patterns could be repeated "N" times with the number of passes accumulated in a storage element. After the Nth sequence the RXA value could be incremented if there are fewer than N/2 passes and decremented if there are N/2 or more passes. This would improve the repeatability of the calibration process.

When RXA is updated, the RX value will also be updated. In this example, the RX value will updated by half the amount used to update RXA, since RX is the average of the RXA and RXB values. If RX has a different relationship to RXA and RXB, the RX update value will be different. Note that in some embodiments, the RX value will need slightly greater precision than the RXA and RXB values to prevent round-off error. In alternate embodiments, the RX value can be updated after pass/fail results of RXA and RXB values have been determined. In some cases, these results may cancel and produce no change to the optimal RX value. In other cases these results may be accumulated and the accumulated results used to determine an appropriate adjustment of the RX setting. According to this embodiment, greater precision of the RX setting relative to the RXA and RXB settings may not be required.

When the RXB value is selected ($t_{PHASER(RXB)}$ in the bottom trace 606 showing a CLKR timing waveform), the rising edge of CLKR is approximately a time $t_H$ earlier than the right edge (the latest time) of the DATAR window 603 containing the value "a". In this case, the CLKR rising edge is on the right edge of the receiver eye, and all the timing margin is on the left side of the window 604, providing more room that required by the $t_S$ timing parameter. This means that there will be essentially no margin for the $t_H$ timing parameter, defining the right edge of the calibration window.

The calibration process will compare the received pattern set to the expected pattern set, and determine if they match. If they match (pass) then the RXB value will be incremented (the offset becomes larger) or otherwise adjusted, so there is less margin for the tH timing parameter. If they do not match (fail) then the RXB value will be decremented (the offset becomes smaller) or otherwise adjusted, so there is more margin for the $t_H$ timing parameter.

As mentioned earlier, the results of transmission and reception of two or more calibration patterns may be accumulated before the RXB value is adjusted. For example, the sequence could be repeated "N" times with the number of passes accumulated in a storage element. After the Nth sequence the RXB value could be decremented if there are fewer than N/2 passes and incremented if there are N/2 or more passes. This would improve the repeatability of the calibration process.

When RXB is updated, the RX value will also be updated. In this example, the RX value will updated by half the amount used to update RXB, since RX is the average of the RXA and RXB values. If RX has a different relationship to RXA and RXB, the RX update value will be different. Note that the RX value will need slightly greater precision than the RXA and RXB values if it is desired to prevent round-off error.

Determination of drift may be made using a similar process, although with different calibration patterns, as explained above.

Bidirectional Link Alternatives

FIG. 12 shows an example of a bidirectional link. In this case, component A (700) and component B (701) each contain a transmitter and receiver connected to the link, so that information may be sent either from A to B or from B to A. The elements of the unidirectional example in FIG. 3 are replicated (two copies) to give the bidirectional example in FIG. 11. FIG. 11 shows two bidirectional components 700, 701 connected with an interconnection medium referred to as Link 702. Normal path 710 acts as a source of data signals for normal operation of component 700 during transmit operations. Normal path 731 acts as a destination of data signals for component 700 during normal receive operations. Likewise, normal path 730 acts as a source of data signals for normal operation of component 701 during transmit operations. Normal path 711 acts as a destination of data signals for component 701 during normal receive operations.

The first bidirectional component includes a block 705 labeled "pattern", which can consist of pattern storage, pattern generation circuitry, or both, and which is used as a source of transmit calibration patterns for both the exhaustive calibration sequences and the calibration sequences used to measure drift. A multiplexer block 706 labeled "mux," implemented for example using a logical layer or physical layer switch, enables the transmit calibration pattern set to be driven onto the link by the transmitter circuit 703. The transmitter drive point can be adjusted by the block 707 labeled "adjust". A sideband communication channel 713 is shown coupled between the component 701 and the component 700, by which the results of analysis of received calibration patterns at the component 701 are supplied to the adjust block 707 of the component 700. Component 700 also has support for calibrating receiver 724, including a block 728 labeled "pattern", which can consist of pattern storage, pattern generation circuitry, or both, and which is used as a source of expected patterns for comparison with received patterns. A block 729 labeled "compare" enables the received pattern set to be compared to the expected pattern set, and causes an adjustment to be made to either the transmitter or receiver. The receiver sample point can be adjusted by the block 732 labeled "adjust".

The second bidirectional component 701 includes complementary elements supporting transmitter 723 and receiver 704. For the receiver operations, a block 708 labeled "pattern", which can consist of pattern storage, pattern generation circuitry, or both, is used as a source of expected patterns. A block 709 labeled "compare" enables the received pattern set to be compared to the expected pattern set, and causes an adjustment to be made to either the transmitter or receiver. The receiver sample point can be adjusted by the block 712 labeled "adjust". The second bidirectional component 701 supports transmission operations, with elements including a block 725 labeled "pattern", which can consist of pattern storage or pattern generation circuitry, and which is used as a source of transmit calibration patterns. A multiplexer block 726 labeled "mux," implemented for example using a logical layer or physical layer switch, enables the transmit calibration pattern set to be driven onto the link by the transmitter circuit 723. The transmitter drive point can be adjusted by the block 727 labeled "adjust". A sideband communication channel 733 is shown coupled between the component 700 and the component 701, by which the results of analysis of received calibration patterns at the component 700 are supplied to the adjust block 727 of the component 701.

FIG. 12 allows both receive sample points and both transmit drive points to be adjusted. However, the benefit of adjustable timing will be realized if there is only one adjustable element in each direction.

The example of FIG. 13 (using the same reference numerals as FIG. 12) shows an example in which only the receiver sample points are adjustable. Thus, elements 707 and 727 of FIG. 12 are not included in this embodiment. This is equivalent to two copies of the elements of example in FIG. 4.

Figures 14, 15:
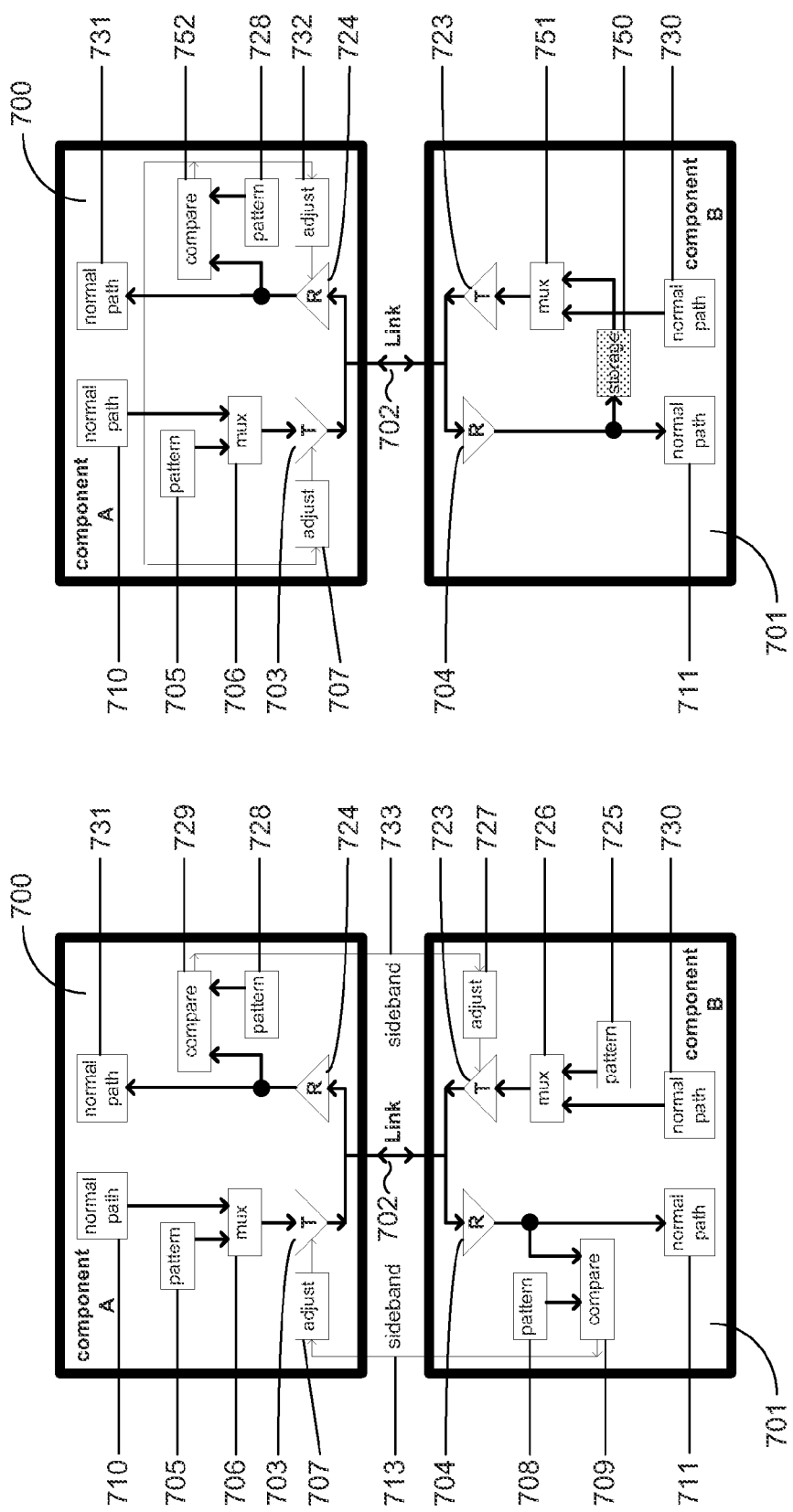
FIG. 14 illustrates an embodiment of the present invention where both components have adjustable transmitter drive points.
FIG. 15 illustrates an embodiment of the present invention where a transmitter drive point and a receiver sample point of only one component on a bidirectional link are adjustable.

The example of FIG. 14 (using the same reference numerals as FIG. 12) shows an example in which only the transmitter drive points are adjustable. Thus, elements 712 and 732 of FIG. 12 are not included in this embodiment. This is equivalent to two copies of the elements of example in FIG. 5.

Example of FIG. 15 (using the same reference numerals as FIG. 12) shows an example in which the receiver sample point and transmitter drive point of the first bidirectional component 700 are adjustable. Thus, elements 712, 708, 709, 727, 726, 725 are not included in this embodiment. A storage block 750 is added between the receiver and a "mux" block 751. The "mux" block 751 is used to select between a normal source of signals 730 and the storage block 750. Also, the compare block 752 is used for analysis of both transmit and receive calibration operations, and is coupled to both the adjust block 707 for the transmitter, and adjust block 732 for the receiver. This alternative is important because all the adjustment information can be kept within one component, eliminating the need for sideband signals for the calibration process. If component 701 were particularly cost sensitive, this could also be a benefit, since only one of the components must bear the cost of the adjustment circuitry.

Calibration Steps for Transmitter for Bidirectional Link

The calibration steps for bidirectional examples in FIGS. 12, 13 and 14 will be essentially identical to the calibration steps already discussed for unidirectional examples in FIGS. 4 and 5. However, the asymmetry in bidirectional example of FIG. 15 will introduce some additional calibration steps, and will receive further discussion.

Figure 16:
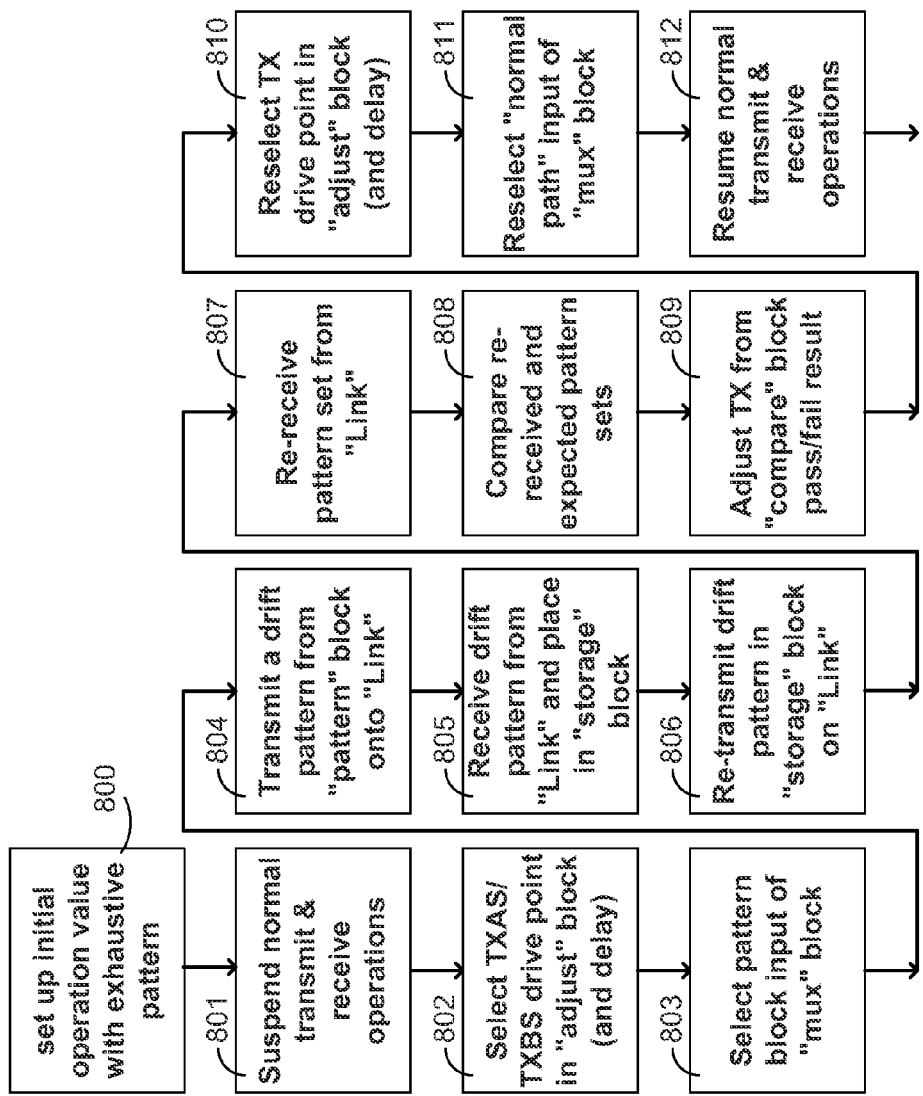
FIG. 16 is a flow chart illustrating calibration steps for a transmitter drive point for a bidirectional link.

FIG. 16 includes the steps needed to perform a timing calibration update for a system like that of FIG. 15.

(Step 800) Execute a first calibration sequence on initialization or other event to establish an operation value "TX" for the transmit drive point, based on long calibration patterns that are intended to be exhaustive, or to provide results usable in the intended conditions for the system.

(Step 801) Periodically, or upon an event indicating that a drift measurement is due, suspend normal transmit and receive operations that are in progress.

(Step 802) Change the drive point of the transmit component (A) from the "TX" operation value (used for normal operations) to either the "TXAS" or "TXBS" edge value (used for calibration operations) in the "adjust" block. It may be necessary to impose a settling delay at this step to allow the new drive point to become stable.

(Step 803) Change "mux" block of the transmit component (A) so that the "pattern" block input is enabled.

(Step 804) A pattern set is created in the "pattern" block of the transmit component (A) and is transmitted onto the "link" using the TXAS or TXBS drive point.

(Step 805) The pattern set is received in the receive component (B). Note that the sample point of the receiver is fixed relative to the reference clock of the system and is not adjustable. The received pattern set is held in the "storage" block in component B.

(Step 806) The "mux" block input connected to the "storage" block in component B is enabled. The pattern set is re-transmitted onto the link by component B.

(Step 807) The pattern set is received by component B from the link.

(Step 808) The received pattern set is compared in the "compare" block to the expected pattern set produced by the "pattern" block in the receive component (A). The two pattern sets will either match or not match. As a result of this comparison (and possibly other previous comparisons) a pass or fail determination will be made.

(Step 809) Adjust either the "TXAS" or "TXBS" edge value in the transmit component (A) as a result of the pass or fail determination to determine a drift value. The "TX" operation value in the transmit component (A) is also adjusted as a result of the determined drift value. This adjustment may only be made after two or more of these calibration sequences have been executed, in order to ensure some level of repeatability.

(Step 810) Change the drive point of the transmitter from the "TXAS" or "TXBS" edge value (used for calibration operations) to "TX" operation value (used for normal operations) in the "adjust" block of the transmit component (A). It may be necessary to impose a settling delay at this step to allow the new drive point to become stable.

(Step 811) Change "mux" block of the transmit component (A) so that the "normal path" input is enabled.

(Step 812) Resume normal transmit and receive operations.

Calibration Steps for Receiver for Bidirectional Link

The calibration steps for the bidirectional examples of FIGS. 12, 13, and 14 will be essentially identical to the calibration steps already discussed for the unidirectional examples of FIGS. 4 and 5. However, the asymmetry in bidirectional example of FIG. 15 will introduce some additional calibration steps, and will receive further discussion.

Figure 17:
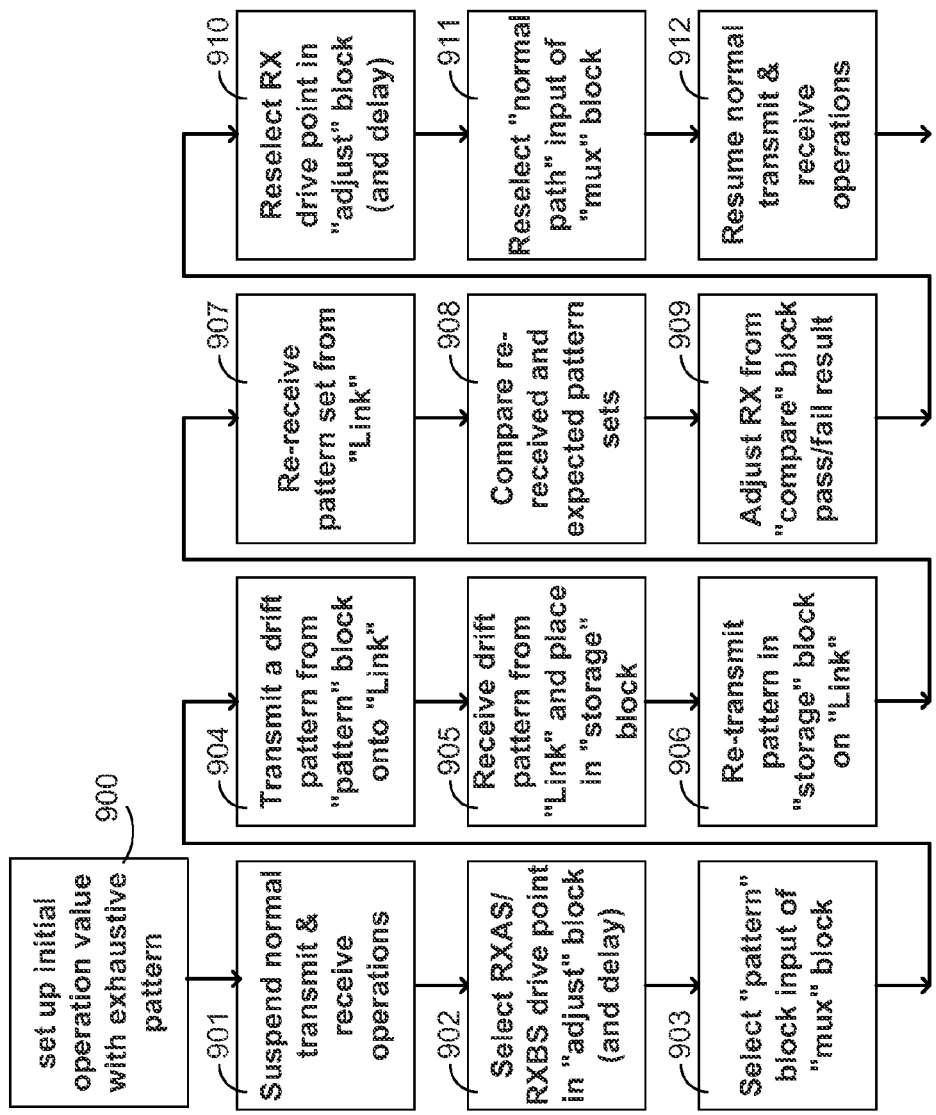
FIG. 17 is a flow chart illustrating calibration steps for a receiver sample point for a bidirectional link.

FIG. 17 includes the steps needed to perform a receiver timing calibration update for a system like that of FIG. 15.

(Step 900) Execute a first calibration sequence on initialization or other event to establish an operation value "RX" for the receive sample point, based on long calibration patterns.

(Step 901) Periodically, or upon an event indicating that a drift measurement is due, suspend normal transmit and receive operations that are in progress.

(Step 902) Change the sample point of the receive component (A) from the "RX" operation value (used for normal operations) to either the "RXAS" or "RXBS" edge value (used for calibration operations) in the "adjust" block. It may be necessary to impose a settling delay at this step to allow the new drive point to become stable.

(Step 903) Change "mux" block of the transmit component (A) so that the "pattern" block input is enabled.

(Step 904) A pattern set is created in the "pattern" block of the transmit component (A) and is transmitted onto the "link". The normal transmit drive point is used.

(Step 905) The pattern set is received in the receive component (B). Note that the sample point of the receiver in component (B) is fixed relative to the reference clock of the system and is not adjustable. The received pattern set is held in the "storage" block in component B.

(Step 906) The "mux" block input connected to the "storage" block in component B is enabled. The pattern set is re-transmitted onto the link by component B.

(Step 907) The pattern set is received by component A from the link using either the RXAS or RXBS value to determine the receiver sample point.

(Step 908) The received pattern set is compared in the "compare" block to the expected pattern set produced by the "pattern" block in the receive component (A). The two pattern sets will either match or not match. As a result of this comparison (and possibly other previous comparisons) a pass or fail determination will be made.

(Step 909) Adjust either the "RXAS" or "RXBS" edge value in the receive component (A) as a result of the pass or fail determination to determine a drift value. The "RX" operation value in the receive component (A) is also adjusted based on this drift value. This adjustment may only be made after two or more of these calibration sequences have been executed, in order to ensure some level of repeatability.

(Step 910) Change the sample point of the receiver from the "RXAS" or "RXBS" edge value (used for calibration operations) to "RX" operation value (used for normal operations) in the "adjust" block of the receive component (A). It may be necessary to impose a settling delay at this step to allow the new drive point to become stable.

(Step 911) Change "mux" block of the transmit component (A) so that the "normal path" input is enabled.

(Step 912) Resume normal transmit and receive operations.

Figure 18:
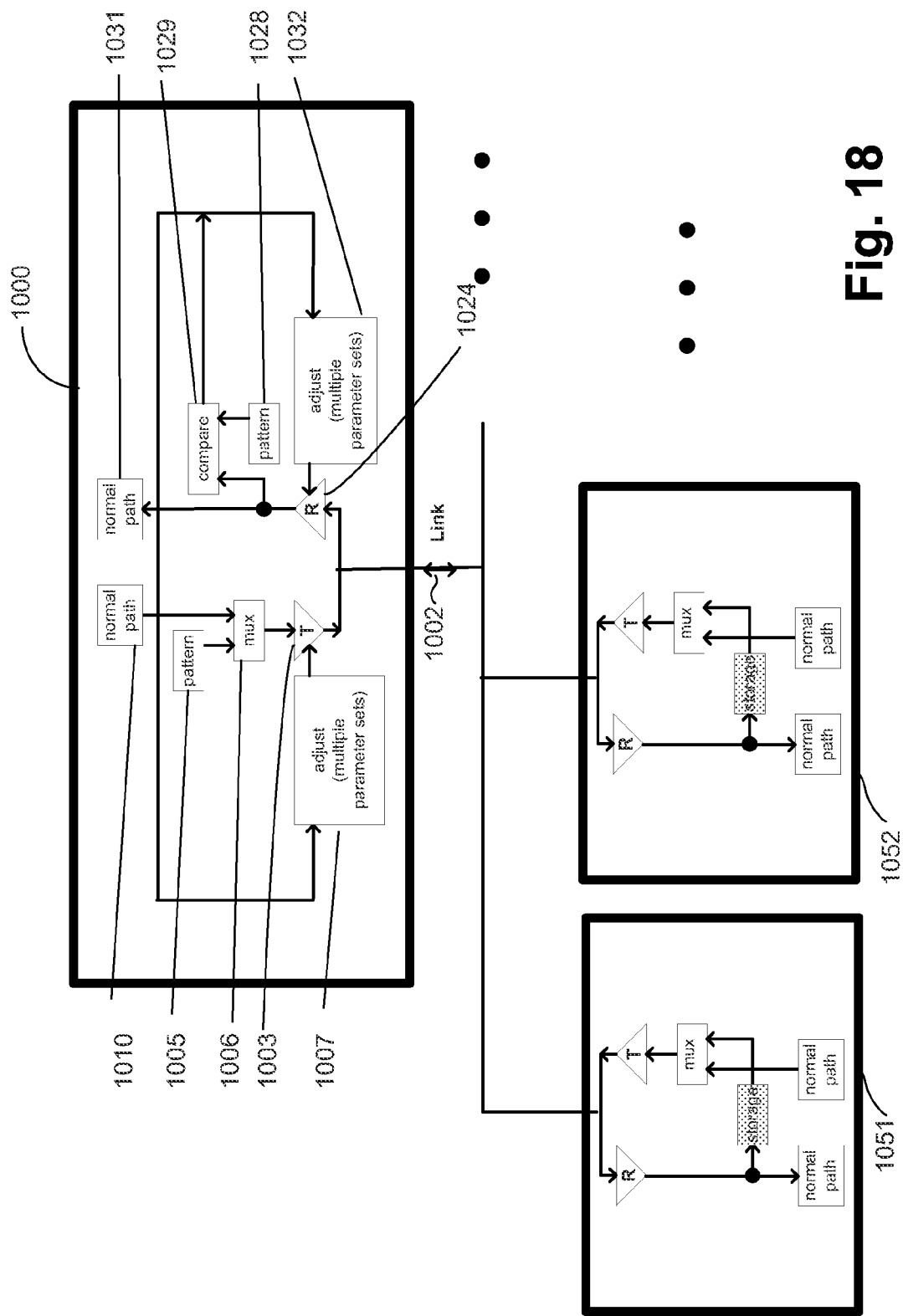
FIG. 18 illustrates an embodiment of the present invention where a transmitter drive point and a receiver sample point of one component on a bidirectional link are adjustable with a plurality of parameter sets, and wherein the bidirectional link is coupled to a plurality of other components corresponding to the plurality of parameter sets.

FIG. 18 illustrates an example like that of FIG. 15, with the exception that the point to point bidirectional link of FIG. 15 is replaced with a multidrop link, coupling component 1000 to a plurality of components 1051, 1052. The multidrop link configuration can be applied in other configurations. In the representative example shown in FIG. 18, a first bidirectional component 1000 and a plurality of other bidirectional components 1051, 1052 are connected in a point to multi-point configuration, or multipoint to multipoint configuration, with an interconnection medium referred to as Link 1002. Normal path 1010 acts as a source of data signals for normal operation of component 1000 during transmit operations. Normal path 1031 acts as a destination of data signals for component 1000, during normal receive operations. The calibration operations are interleaved, and re-ordered, in this embodiment with normal communications, as described above to improve throughput and utilization of the communication medium.

The first bidirectional component 1000 includes a block 1005 labeled "pattern", which can consist of pattern storage or pattern generation circuitry, and which is used as a source of transmit calibration patterns. A multiplexer block 1006 labeled "mux," implemented for example using a logical layer or physical layer switch, enables the transmit calibration pattern set to be driven onto the link by the transmitter circuit 1003. The transmitter drive point can be adjusted by the block 1007 labeled "adjust". In this embodiment, the adjust block 1007 includes storage for multiple parameter sets which are applied depending on the one of the other components 1051, 1052, . . . on the link to which the transmission is being sent. Component 1000 also has support for calibrating receiver 1024, including a block 1028 labeled "pattern", which can consist of pattern storage or pattern generation circuitry, and which is used as a source of expected patterns for comparison with received patterns. A block 1029 labeled "compare" enables the received pattern set to be compared to the expected pattern set, and causes an adjustment to be made to either the transmitter or receiver. The receiver sample point can be adjusted by the block 1032 labeled "adjust". In this embodiment, the adjust block 1007 includes storage for multiple parameter sets which are applied depending on the one of the other components 1051, 1052, . . . on the link from which the communication is being received. In the first component 1000, the compare block 1029 is used for analysis of both transmit and receive calibration operations, and is coupled to both the adjust block 1007 for the transmitter, and adjust block 1032 for the receiver. In the example of FIG. 18, the receiver sample point and transmitter drive point of the first bidirectional component 1000 are adjustable. The other components 1051, 1052, . . . are implemented as described with reference to FIG. 15 without adjustment resources, in this example, and not described here. In alternative embodiments, the components 1051, 1052, . . . on the link may be provided with adjustment and calibration resources, as described for other embodiments above.

The embodiments described above involve calibration of timing parameters. Other embodiments of the invention are applied to calibration of other parameters of the communication channel, including voltage levels for drivers and comparators, resistance values such as link termination resistances, driver strength, adaptive equalization coefficients, noise cancellation coefficients, parameters that cause overshoot and undershoot of signals such as driver switching power or speed, and so on. These parameters are reflected in drifting flight times, output delays for transmitters, receiver mismatches and input delays. Also, drift occurs due to spread spectrum clocking The calibration sequences used for tracking drift are executed from time to time. In some embodiments of the invention, the calibration sequences for tracking drift are initiated in response to a timer, or upon sensing a change in a condition that could cause drift such as ambient temperature, temperature of a component or printed circuit board, power supply voltage variations, system state changes like switches between low and higher speed or power modes of operation, host system or system management commands, and so on. The timing for the calibration sequences is selected in preferred systems depending on time constants expected for the drifting conditions likely to have an effect on the parameters being calibrated.

According to the present invention, communication systems are provided that support periodic calibration to track drift, while conserving resources of the communication channels being calibrated. The invention reduces the hardware and storage requirements needed for calibration, reduces the impact on bandwidth and throughput across the communication channel, and maintains accuracy of the operation values of the parameters being calibrated while using less of the resources of the communication channel. The calibration sequences tracking drift can be run more often, because overhead is smaller, than prior art schemes. Also, the techniques of the present invention improve overall latency characteristics of the communication channel in changing operating conditions.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of operation as carried out by a receive component, the method comprising:
    performing a first calibration during initialization to identify an initial value for a parameter affecting proper reception at the receive component of data communicated across a channel;
    periodically performing a second calibration to update an existing value of the parameter for drift attributable to change in at least one of operating voltage or temperature; and
    wherein the existing value is dependent on the initial value and wherein the second calibration is constrained to occur during a time period that is shorter than a time period of the first calibration.

2. The method of claim 1, wherein periodically performing includes calculating an interval and repeatedly (a) performing the second calibration at each expiration of the interval and (b) resetting the interval.

3. The method of claim 1, wherein the parameter is a voltage level for a comparator.

4. The method of claim 1, wherein the parameter is a link termination resistance.

5. The method of claim 1, wherein the parameter is a driver strength.

6. The method of claim 1, wherein periodically performing the second calibration includes using less resources of the channel than when performing the first calibration.

7. The method of claim 1, wherein performing the first calibration comprises performing a first set of operations to exhaustively determine the initial value of the parameter, and wherein performing the second calibration comprises performing a second set of operations to update the existing value if a desired value of the parameter has drifted from the existing value by more than a delta value.

8. The method of claim 1, wherein performing the second calibration comprises suspending transmit and receive operations on the receive component.

9. The method of claim 8, wherein performing the first calibration comprises receiving a first pattern transmitted by a transmit component to the receive component and comparing, in the receive component, the first pattern with a first expected pattern, and wherein performing the second calibration comprises receiving a second pattern transmitted by the transmit component to the receive component and comparing in the receive component the second pattern with a second expected pattern.

10. A receive component for use in a signaling system, in which a transmit component and the receive component are to communicate data across a channel, the receive component comprising:
    receiver circuitry to
        perform at system initialization a first calibration, the first calibration to identify an initial value for a parameter affecting proper reception by the receiver circuitry of the data communicated across the channel, and
        perform thereafter on a periodic basis a second calibration, the second calibration to update an existing value of the parameter for drift attributable to change in at least one of voltage or temperature; and
    circuitry to store the existing value of the parameter, the existing value of the parameter dependent on the initial value and any updates from the second calibration;
    wherein
        the receive component is to apply the existing value when receiving the data communicated across the channel, and
        the second calibration is constrained to be performed during a time period that is shorter than a time period of the first calibration.

11. The receive component of claim 10, wherein the second calibration is to be performed at expiration of an interval of time, at which the receive circuitry is to suspend receive operations.

12. The receive component of claim 11, wherein passage of the interval of time is to be tracked by the transmit component and the second calibration is to be initiated by the transmit component.

13. The receive component of claim 10, wherein the parameter is a link termination resistance.

14. The receive component of claim 10, wherein the parameter is a driver strength for a driver of the receive component.

15. The receive component of claim 10, wherein the receive circuitry is to perform, responsive to the second calibration, one of an increment operation or a decrement operation upon the existing value if a desired value of the parameter has drifted from the existing value by more than a delta value.

16. The receive component of claim 10, further comprising circuitry to store a first expected pattern and a second expected pattern, and circuitry to compare the first expected pattern with a pattern received from the transmit component in association with the first calibration, and to compare the second expected pattern with a pattern received from the transmit component in association with the second calibration.

17. A receive component comprising:
    circuitry to store an existing value representative of at least one of a termination resistance and a driver strength to be applied in association with data communicated across a channel;

circuitry to perform a first calibration at system initialization, to identify a first value to be initially applied as the existing value, the first calibration to be performed during a first calibration interval prior to normal system operation; and circuitry to periodically perform a second calibration, to update the existing value;

wherein the existing value is initially set and periodically updated responsive to the first calibration and the second calibration, respectively, and wherein the second calibration is constrained to be performed during a time period that is shorter than a time period of the first calibration.

18. The receive component of claim 17, wherein the circuitry to perform the second calibration is, responsive to the second calibration, to perform one of an increment operation or a decrement operation upon the existing value if the desired value has drifted from the existing value by more than a delta value relative to an existing value.

19. The receive component of claim 18, further comprising circuitry to store a first expected pattern and a second expected pattern, and circuitry to compare the first expected pattern with a pattern received from an external component in association with the first calibration, and to compare the second expected pattern with a pattern received from the external component in association with the second calibration.

* * * * *